US008706322B2

(12) United States Patent
Johnson

(10) Patent No.: US 8,706,322 B2
(45) Date of Patent: Apr. 22, 2014

(54) METHOD AND COMPUTER PROGRAM PRODUCT FOR CONTROLLING INERTIAL ATTITUDE OF AN ARTIFICIAL SATELLITE BY APPLYING GYROSCOPIC PRECESSION TO MAINTAIN THE SPIN AXIS PERPENDICULAR TO SUN LINES

(75) Inventor: William M. Johnson, Sudbury, MA (US)

(73) Assignees: Kara Whitney Johnson, San Francisco, CA (US); Brett Harper Johnson, New York, NY (US)

( * ) Notice: Subject to any disclaimer, the term of this patent is extended or adjusted under 35 U.S.C. 154(b) by 350 days.

(21) Appl. No.: 13/212,433

(22) Filed: Aug. 18, 2011

(65) Prior Publication Data

US 2011/0297794 A1 Dec. 8, 2011

Related U.S. Application Data

(63) Continuation-in-part of application No. 12/363,959, filed on Feb. 2, 2009, now Pat. No. 8,676,503, which is a continuation-in-part of application No. 11/818,723, filed on Jun. 15, 2007, now Pat. No. 7,739,003.

(60) Provisional application No. 60/815,068, filed on Jun. 20, 2006.

(51) Int. Cl.
*B64G 1/32* (2006.01)
*B64G 1/36* (2006.01)
*G05D 1/08* (2006.01)

(52) U.S. Cl.
USPC ............. 701/13; 244/164; 244/166; 244/171

(58) Field of Classification Search
USPC .............. 701/4, 13; 244/158.6, 164, 166, 171
See application file for complete search history.

(56) References Cited

U.S. PATENT DOCUMENTS

| 3,305,671 | A | | 2/1967 | Manoni, Jr. | |
|---|---|---|---|---|---|
| 4,306,692 | A | * | 12/1981 | Kaplan et al. | 244/165 |
| 4,883,244 | A | * | 11/1989 | Challoner et al. | 244/171 |
| 5,209,437 | A | * | 5/1993 | Fantar | 244/164 |
| 5,452,869 | A | * | 9/1995 | Basuthakur et al. | 244/164 |
| 6,362,464 | B1 | | 3/2002 | Liu et al. | |
| 6,577,929 | B2 | | 6/2003 | Johnson et al. | |
| 7,216,036 | B2 | | 5/2007 | Brady et al. | |
| 7,410,130 | B2 | | 8/2008 | Wang et al. | |

(Continued)

OTHER PUBLICATIONS

Ergin et al., "Magnetic Attitude Control of a Spinning Satellite", J. Spacecraft vol. 2 (6), TRW Systems, Redondo Beach, Calif., 2 pgs.

*Primary Examiner* — Joseph W Sanderson
(74) *Attorney, Agent, or Firm* — Preti Flaherty Beliveau & Pachios LLP

(57) ABSTRACT

A method of controlling inertial attitude of an artificial satellite in order to perform a navigation function and to maximize terrestrial coverage of the Earth by the satellite. The method includes deploying the artificial satellite in an orbit about the poles of the Earth; applying gyroscopic precession to the artificial satellite spin axis to process and maintain the satellite near the ecliptic pole; deploying the artificial satellite so that the spin axis is initially perpendicular to or substantially perpendicular to sun lines; and applying gyroscopic precession to the artificial satellite spin axis to precess the spin axis away from an initial deployed attitude at a selectively-variable precession rate and to maintain the spin axis perpendicular to or substantially perpendicular to the sun lines.

21 Claims, 17 Drawing Sheets

(56) References Cited

U.S. PATENT DOCUMENTS

| | | |
|---|---|---|
| 7,681,841 B2* | 3/2010 | Wang et al. .................... 244/171 |
| 7,739,003 B2* | 6/2010 | Johnson ............................ 701/4 |
| 8,185,262 B2* | 5/2012 | Johnson ............................ 701/4 |
| 2003/0023355 A1* | 1/2003 | Johnson et al. ................... 701/4 |
| 2005/0071055 A1* | 3/2005 | Needelman et al. ............ 701/13 |
| 2008/0087769 A1* | 4/2008 | Johnson ........................ 244/166 |
| 2008/0135686 A1* | 6/2008 | Wang et al. .................... 244/171 |
| 2009/0222153 A1* | 9/2009 | Johnson .......................... 701/13 |
| 2010/0228407 A1* | 9/2010 | Johnson .......................... 701/13 |
| 2011/0297794 A1* | 12/2011 | Johnson ........................ 244/165 |

* cited by examiner

Gyroscopic Precession Equation:

$\bar{T} = \bar{\omega}_p \times \bar{L}$   vector cross product (assume orthogonal relationship)
  T   is the applied torque (from current loop)
  $\omega_p$   is the resultant desired precession rate
  L   is the angular momentum of the small spinning satellite $\omega_p = \dfrac{T}{L}$     $L = I\,\omega_s$     where I = moment of inertia about spin axis
                         and $\omega_s$ is the spin rate (20 RPM)

$T = BiA$        from current loop in magnetic field B
1 amp is a reasonable number       i = required current from solar cell array
for a 100 cm² Si solar cell        (assume i = 1 amp from solar cell array)
sunlight = 1000 $\dfrac{\text{watts}}{m^2}$    $A \sim \pi R^2$    A = area of current torque loop
                    $I \sim MR^2$    M = mass of satellite ~ 50 kg
                              R = radius of satellite ~ 1/3 meter
Earth's magnetic field           B = 50 x 10(-6) Tesla = 50 x 10(-6) $\dfrac{N}{\text{amp-m}}$
near surface:                    N = newton (unit-of-force)

$\omega_p = \dfrac{BiA}{I\omega_s}$    note that when $I\omega_s$ is <u>relatively</u> small (small satellite @ 20 RPM)
                then $\omega_p$ is <u>relatively</u> large (depending on B, i and A)

$\omega_p = \dfrac{\cancel{50} \times 10(-6)\ \underline{N}\ \times 1\ \cancel{amp}\ \times\ \pi \cancel{R^2 \times m^2}}{\cancel{amp\text{-}m}}$
          ─────────────────────────────────────────────
          $\cancel{50}\ kg\ \times \cancel{R^2 \times m^2}\ \times 20\ \dfrac{\cancel{rev}}{\cancel{min}}\ \times\ \dfrac{2\cancel{\pi}\ rad}{\cancel{rev}}\ \times\ \dfrac{\cancel{min}}{60\ sec}$ $\omega_p = \dfrac{1.5 \times 10(-6)\ \cancel{N}\text{-}sec}{\cancel{kg\text{-}m}} \times \dfrac{\cancel{kg\text{-}m}}{sec^2 \cdot \cancel{N}} \times \dfrac{60\ deg}{rad}$ $\omega_p = 9 \times 10(-5)\ \dfrac{deg}{sec}$     (for 1 amp)

To get 2 degree precession, the required time (t) is:
2 degree = $\omega_p \times t = 9 \times 10(-5)\ \dfrac{deg}{sec} \times t$     and  t ~ 22,000 sec ~ 6.2 hours
                                              which is a relatively short time for
                                              long mission scenarios

*FIG. 7*

(ACQUISITION MODE)

(NULLING MODE)

METHOD AND COMPUTER PROGRAM PRODUCT FOR CONTROLLING INERTIAL ATTITUDE OF AN ARTIFICIAL SATELLITE BY APPLYING GYROSCOPIC PRECESSION TO MAINTAIN THE SPIN AXIS PERPENDICULAR TO SUN LINES

CROSS REFERENCE TO RELATED APPLICATIONS

This application is a continuation-in-part of U.S. application Ser. No. 12/363,959 filed on Feb. 2, 2009 entitled METHOD OF DETERMINING AND CONTROLLING THE INERTIAL ATTITUDE OF A SPINNING, ARTIFICIAL SATELLITE AND SYSTEMS THEREFOR, which is a continuation-in-part of U.S. application Ser. No. 11/818,723 filed Jun. 15, 2007, now U.S. Pat. No. 7,739,003 and entitled METHOD OF DETERMINING AND CONTROLLING THE INERTIAL ATTITUDE OF A SPINNING, ARTIFICIAL SATELLITE AND SYSTEMS THEREFOR, which claims the benefit of priority through U.S. Provisional Application No. 60/815,068 filed Jun. 20, 2006.

STATEMENT REGARDING FEDERALLY SPONSORED RESEARCH OR DEVELOPMENT (Not applicable)

BACKGROUND OF THE INVENTION

The present invention relates to the field of guidance, navigation, and control avionics, and, more particularly, to devices, systems, and methods for controlling the inertial attitude of an artificial, spinning satellite so as to support an accurate orbital navigation function and to support greater terrestrial coverage using the satellite.

Such small, artificial, spinning satellite constellations can collect data using, for example, optical or other sensor instrumentation. Necessarily, these data must be referenced to an inertial attitude sensing system that is an integrated part of the spinning satellite. Thus, attitude determination for both spinning and three-axis stabilized satellites is a critical operational function.

Historically, measurement of inertial attitude of an artificial satellite, a strategic missile, and the like has used an optical sensor, such as a star tracker, in combination with an accurate, inertial reference sensor suite consisting of at least three gyroscopes. See, for example, U.S. Pat. No. 6,577,929 to Johnson, et al., which is incorporated in its entirety herein by reference.

According to Johnson, et al., for higher accuracy and reliability, one classic form of an accurate gyroscope was a single-axis, floated, integrating-rate gyroscope. Briefly, inside each gyroscope, there is a rapidly-spinning wheel that is perpendicular inside a first can, which is floated inside a second can. An angular rate sensor disposed on the symmetric axis between the two cans is adapted to measure the angular precession rate due to one or more torques acting normal to the angular momentum vector along the spin motor axis effectively. Hence, an inertial reference sensor suite of three single-axis gyroscopes has been used to provide a complete inertial attitude reference, i.e., roll, pitch and yaw.

Typically, the gyroscopes are structured and arranged generally orthogonally to one another, to measure roll, pitch, and yaw (rates and angles) with a certain amount of long-term angle drift error. Periodic inertial attitude updates by the star tracker can bound the effect of the gyroscopes' drift errors.

Conventional artificial satellites, strategic missiles, and the like are nominally not spinning, but may have a random attitude drift. Moreover, the inertial reference sensor is nominally not strapped to the artificial satellite, strategic missile, and the like, but is gimbaled so that the gyroscope sensors can be maintained in "inertial space" for better performance.

For some artificial satellites such as NASA's Apollo, the star tracker is gimbaled to the artificial satellite separately from the gyroscope inertial package. For some artificial satellites, the gyroscope and/or the star tracker may be strapped to the "low-attitude rate" satellite frame. While, for some strategic missiles, such as the surface-launched ballistic missile (SLBM), the star tracker can be mounted on a gyroscope-stabilized platform, oriented at stars or other astronomical objects through a "window" in the gimbals.

None of the above-mentioned concepts, however, is considered to be very small, light-weight, and/or ultra-low-power. Consequently, none of the above-mentioned concepts is considered to be useable on a class of small, light-weight, ultra-low-power spinning satellites.

Furthermore, critical issues that must be included in or accounted for in design include radiation susceptibility, temperature susceptibility, e.g., susceptibility to extreme temperature magnitudes and temperature gradients, and dynamic motion susceptibility. For example, to achieve a reliable attitude determination system suitable for a long-duration space vehicle that will operate over the South Atlantic Anomaly and/or the Van Allen Belts, optical sensors that are susceptible to total dose and/or single event latch-up radiation effects, e.g., a CCD or an APS sensor, are undesirable.

Accordingly, elimination of MEMS instrument gyroscopes, which include electronic components that are not radiation-hard, especially in a relatively high-radiation, relatively high-dynamic temperature, relatively high-dynamic acceleration environment, is desirable. Additional reasons for replacing MEMS gyroscopes include the extensive, real-time, calibration and compensation requirement associated with MEMS gyroscopes and their inherently high drift rates.

Therefore, it would be desirable to provide methods and systems for accurately determining inertial attitude of an artificial spinning satellite, a strategic spinning missile, and the like and, additionally, to provide methods and systems for controlling or adjusting the inertial attitude of the artificial spinning satellite, strategic spinning missile, and the like. Moreover, it would be desirable to provide such methods and systems that also reduce volume, weight, and power requirements.

SUMMARY OF THE INVENTION

A method of and apparatus for determining or predicting the inertial attitude of a spinning artificial satellite and for controlling the inertial attitude of a spinning artificial satellite without using a suite of inertial gyroscopes is disclosed. The method and apparatus operate by tracking three astronomical objects near the Earth's ecliptic pole, the satellite's spin axis, and/or the optical device's axis and processing the track information. The method and apparatus more particularly include the steps and means for, first, selecting three preferred astronomical objects using a histogram method and, subsequently, determining a square of a first radius ($R_1^2$) of a track of a first astronomical object; determining a square of a second radius ($R_2^2$) of a track of a second astronomical object; determining a square of a third radius ($R_3^2$) of a track of a third astronomical object; determining the inertial attitude of the spin axis using the squares of the first, second, and third radii ($R_1^2, R_2^2,$ and $R_3^2$) to calculate pitch, yaw, and roll rate; determining a change (or predicting a change) in the pitch and yaw of the artificial satellite; and controlling on-board-generated current flow to orthogonally-disposed torque-producing, current-carrying loops to act against the Earth's magnetic field, to apply gyroscopic precession to the spinning satellite to correct and maintain its inertial attitude.

Advantageously, the disclosed method and apparatus provide an artificial spinning satellite that requires no moving parts other than the initial spin rotation of the rigid-body, artificial satellite itself. Furthermore, control of current to torque-producing devices reduces current-switching frequency by using the spin rate of the satellite instead of a multiplicity of switching events.

The resulting system is a small, relatively light, ultra-low-power apparatus that includes a closed-loop control for autonomous, real-time, inertial attitude control. The resulting system that is compatible with a proliferation of artificial spinning satellites is accurate, reliable, and radiation-hard, providing, further, operating redundancy, relatively low-operating costs, no moving parts, and, optionally, an ability to be controlled from a terrestrial processing device.

Additionally, as mentioned above, with regard to reliability of the implementation of space-based instrumentation, additional critical issues that must be included or accounted for in design include radiation susceptibility, temperature susceptibility, and dynamic motion susceptibility. Implementation of an Electron Bombardment Complementary Metal-Oxide-Silicon (EBCMOS) optical sensor, which is inherently radiation-hard, in combination with a radiation-hard processor, e.g., a micro-controller having large features and ultra-low-power with a space track record, is desirable.

The low-light-level EBCMOS optical sensor uses the feature of Electronic Bombardment (EB) in which a local high voltage provides a gain greater than 100, i.e., 100 electrons output per each photon at the photocathode. This high gain enables the "thinning" of the photocathode—thus reducing the bulk of material where deleterious radiation effects occur. The lost sensitivity at the photocathode is recovered with the extremely high gain, resulting in superior sensitivity, noise performance, bandwidth capability, and other sensor performance measures.

The present invention also uses a radii-squared histogram algorithm to measure a radius parameter that is independent of any angular smearing effect that would occur only in the tangential direction if there were any smearing effect in the small-angle, e.g., two-degree, field-of-view during the relatively slow 20 RPM spin rate. The relatively high sampling rate of the high gain EBCMOS optical sensor further mitigates the smearing effect as does the averaging of a multiplicity of radii-squared measurements over the three-second rotation measurement period.

The present invention additionally provides real-time, near-autonomous, accurate navigation of the satellite and broad terrestrial surveillance coverage via controlled precession of the spin axis at between 0 and 1 degree per day. The satellite space navigation function in an earth coordinate frame is provided by a navigation sextant-type optical configuration where an optical earth horizon sensor (reference) is added to the existing spinning optical star sensor.

The earth horizon sensor is strapped to the spinning satellite at right angles to the spin axis of the star sensor. The entire configuration spins together and is rigid with no relative moving parts. This configuration provides one option of using a 45-degree mirror to share the star sensor, e.g., a mosaic array, with the horizon sensor. This eliminates misalignment errors providing more accuracy for the satellite navigation solution. This optical approach also eliminates gyros and accelerometers recently used for terrestrial navigation of vehicles.

Just as mariners use a sextant and the North Star to determine latitude by measuring the vertical angle between the North Star to the horizon, the earth horizon sensor makes a simple, accurate, automatic, real-time, autonomous measurements using a star/horizon/clock sextant for a satellite navigation update in earth coordinates.

BRIEF DESCRIPTION OF THE DRAWINGS

The invention is pointed out with particularity in the appended claims. However, the advantages of the invention described above, together with further advantages, may be better understood by referring to the following description taken in conjunction with the accompanying drawings. The drawings are not necessarily drawn to scale, and like reference numerals refer to the same parts throughout the different views.

FIG. 7 is intentionally left blank;

DETAILED DESCRIPTION OF THE INVENTION

Figure 1:
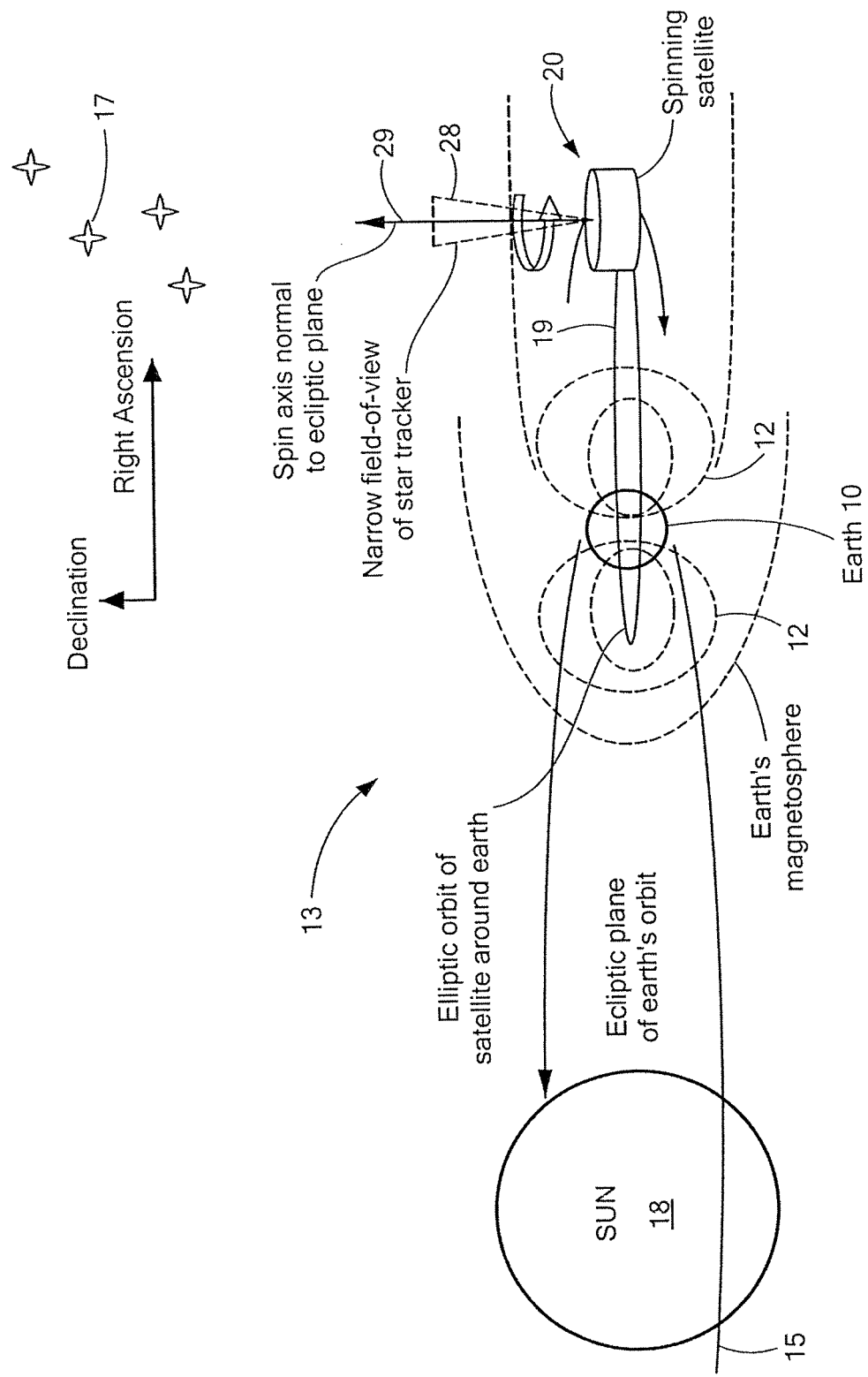
FIG. 1 is a graphical illustration of a coordinate reference for and working environment of the present invention.

U.S. application Ser. No. 12/363,959 filed on Feb. 2, 2009 entitled METHOD OF DETERMINING AND CONTROLLING THE INERTIAL ATTITUDE OF A SPINNING, ARTIFICIAL SATELLITE AND SYSTEMS THEREFOR and U.S. application Ser. No. 11/818,723 filed Jun. 15, 2007, now U.S. Pat. No. 7,739,003, entitled METHOD OF DETERMINING AND CONTROLLING THE INERTIAL ATTITUDE OF A SPINNING, ARTIFICIAL SATELLITE AND SYSTEMS THEREFOR are hereby incorporated by reference herein.

Methods and systems for accurately determining and controlling the inertial attitude of an artificial satellite, a spinning satellite, a spinning strategic missile, a spinning communication antenna system, a spinning surveillance satellite system, a spinning station-keeping formation system, a spinning scientific measurement satellite system, a spinning astronomical measurement satellite system, and the like (hereinafter, collectively referred to as "an artificial satellite" for brevity) are disclosed. The disclosed methods constitute an improvement to the methods discussed in U.S. Pat. No. 6,577,929 to Johnson, et al., which is incorporated in its entirety herein by reference.

Briefly, U.S. Pat. No. 6,577,929 discloses methods for measuring the inertial attitude of artificial satellites and, more particularly, for measuring the inertial attitude of spinning, artificial satellites or non-spinning, three-axis stabilized artificial satellites. According to U.S. Pat. No. 6,577,929, an optical sensor, such as a star tracker, is used to measure the radius of the celestial track of each of three or more astronomical objects. These radii measurements of the tracks of the three or more astronomical objects are, then, used to obtain the inertial attitude of a spin axis of the satellite in a right ascension/declination (RA/DEC) coordinate frame.

More specifically, the field-of-view of the optical sensor is structured and arranged parallel or substantially parallel to the spin axis of the artificial satellite and, preferably, directed towards a substantially fixed location in the celestial sphere, e.g., the ecliptic pole normal to the Earth's ecliptic plane. Consequently, the tracks of the three or more astronomical objects in the field-of-view can be obtained by imaging the field-of-view onto an optical sensor substantially along the spin axis of the spinning artificial satellite, or by rotating the optical sensor about the spin axis of the spinning artificial satellite or about the spin axis of the optical sensor itself.

The radii measurements are substantially orthogonal to the roll gyroscope error and, consequently, are substantially unaffected by the roll gyroscope scale factor error accumulation. Hence, the inertial attitude sensor, i.e., the three, low-accuracy gyroscope sensor suite, can determine inertial attitude with a high degree of accuracy, further, offering small size and relatively low power needs.

However, it is well-known to those of ordinary skill in the art that if the artificial satellite spins about its desired spin axis, the spin vector acting normal to the spin axis will tend to remain stationary in inertial space. Indeed, Newton's First Law of Motion provides that "A body in motion tends to remain in motion unless acted on by outside forces". This applies to both linear motion and angular motion. Thus, in a very low-torque environment—such as outer space—angular motion tends to remain constant.

By analogy, a bullet is very small and light-weight. The rifling in a gun barrel gives a bullet, upon leaving the gun barrel, a substantially uniform angular motion, or spin rate. As a result, the bullet remains pointed forward (along its spin axis), has a better response to external wind and other disturbances, and non-symmetric, aerodynamic effects are averaged out over the duration of the spin cycle.

Unlike an artificial satellite, the function of a bullet is not taking measurement data. Hence, a bullet has no need for providing an inertial attitude reference for the measurement data or for attitude control. Artificial satellites, however, are structured and arranged to acquire data for which an inertial attitude reference for these data and attitude control are crucial.

If an on-board propellant system and an inertial reference suite of gyroscopes are added to the bullet, the combination is unlikely to remain very small or light-weight. Similarly, if an on-board propellant system and inertial reference suite of gyroscopes are added to a conventional, artificial satellite, to provide attitude measurement and control, the artificial satellite is also unlikely to remain very small or light-weight and/or ultra-low power.

The addition of an inertial reference suite of instrument gyroscopes is further exacerbated by the additional volume, weight, and power requirements of such instrumentation. Also, for example, attitude thrusters, stored attitude thruster fuel, and associated computation, plumbing, and ancillary structure needed to control the inertial attitude, historically, have reduced the mission time of the artificial satellite. Accordingly, the present invention can determine and control the inertial attitude of an artificial satellite, and, more particularly, a spinning, artificial satellite, without using the inertial reference suite of gyroscopes disclosed and claimed in U.S. Pat. No. 6,577,929. Because the present invention uses torque-producing, current-carrying loops to precess the spin axis of the artificial satellite, volume, weight, and power requirements for propulsive attitude control are virtually eliminated.

Indeed, the artificial satellite spinning about a spin axis with a constant spin rate and inertia has an angular momentum (spin) vector that is analogous to the spin axis of an instrument-quality, single-axis, floated gyroscope. The artificial satellite floats in space with very small torque disturbances similar to the small can that floats inside the large can of a single-axis, floated gyroscope. If an external torque acts on the spinning satellite, then the spin vector will precess in inertial space perpendicular to the spin axis and to the torque axis similar to the precession of a single-axis, floated, gyroscope.

Moreover, because the artificial satellite is structured and arranged and, further, controlled to remain oriented in the inertial spin direction and because the inertial attitude is relatively unaffected by small internal and/or external torques acting on the artificial satellite, the inertial attitude control system becomes a simple, real-time, linear, closed-form, passive system. Indeed, the pitch and yaw axes, which correspond to the right ascension and the declination, respectively, are inertially stable. Accordingly, through adjustments, the spin axis tends to remain inertially stable. The spin, or roll, axis, which is not stable; however, it has a relatively-constant angular rate.

In short, the present invention is predicated on the fact that a spinning, artificial satellite itself exhibits the same or similar characteristics of a gyroscope. More importantly, the spinning artificial satellite includes "memory" of inertial attitude as does a gyroscope. Accordingly, it is unnecessary and disadvantageous to include a redundant inertial attitude suite of three instrument gyroscopes on a spinning, artificial satellite. More particularly, the artificial satellite "knows" that, absent any external torques, the pitch and yaw angles will remain constant. With no external torques, the roll angle is merely the integrated value of a constant spin rate. Thus, the relative attitude measurement system of a spinning, artificial satellite does not need redundant instrument gyroscopes. In addition, high-torque thrusters, stored attitude thruster fuel, and associated computation, plumbing, and ancillary structure can be eliminated, drastically reducing weight and power requirements and increasing mission time.

The Absolute Attitude Measurement System

Referring to FIG. 1, the employment environment and frame of reference for an inertial attitude control and determining system for an artificial satellite and, more particularly, for a spinning, artificial satellite, are shown. FIG. 1 shows our heliocentric solar system 13 having a Sun 18 and an Earth 10. The Earth 10 orbits about the Sun 18 about an ecliptic plane 15. The ecliptic plane 15 includes an ecliptic pole (at the top of the figure) that is normal thereto.

Also shown is a spinning, artificial satellite 20. The spinning, artificial satellite 20 is purposely, manually deployed in space to spin about a spin axis 29, which, preferably, is normal to the ecliptic plane 15 of the Earth's orbit 15 and, hence, parallel or virtually parallel toward the ecliptic pole. For illustrative purposes only, the rate of spin of the spinning, artificial satellite 20 is about 20 revolutions per minute (RPM). Hence, it takes about three seconds for each full revolution.

The spinning, artificial satellite 20 is adapted to orbit about the Earth 10 along an elliptic orbit 19. The orbit 19 of the artificial satellite 20 passes through and is influenced by an ambient magnetic field, which is to say, the Earth's magnetosphere 12. The influence of the Earth's magnetosphere 12 on the spinning, artificial satellite 20 depends, inter alia, on the strength of the magnetosphere 12 and the location of the spinning, artificial satellite 20 within the magnetosphere 12 and with respect to its elliptic orbit 19.

Optionally, the artificial satellite 20 includes a magnetometer 27 (in FIG. 2) for measuring the strength of the Earth's magnetosphere 12. The magnetometer 27 is operatively coupled to the artificial satellite 20 by a deployment arm 25 and electrically coupled to a processor to which measured magnetic field strength data can be transmitted for processing and use.

In lieu of a magnetometer 27, the artificial satellite 20 can include, instead, a virtual model of the Earth's magnetosphere 12, e.g., a software application, by which the strength of the magnetic field can be estimated given an instantaneous inertial attitude. Alternatively, the artificial satellite 20 can include means for instantaneously back-calculating the strength of the magnetic field, e.g., a software application, by measuring the rate of precession of the artificial satellite caused by a pre-determined electromagnetic field proximate the artificial satellite 20.

Figure 2:
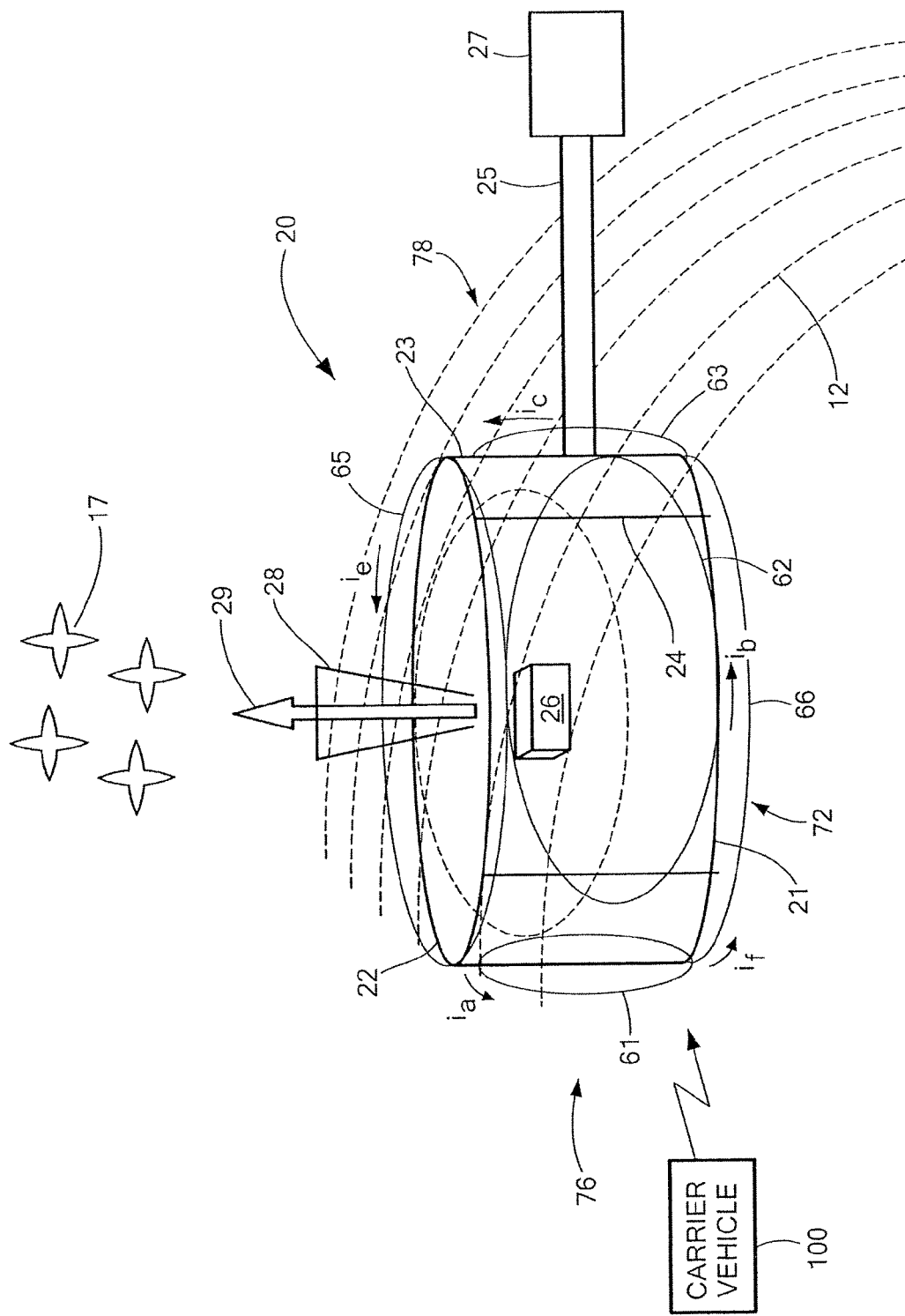
FIG. 2 is a graphical illustration of an artificial satellite in accordance with the present invention.

Referring to FIG. 2, the artificial satellite 20 shown is cylindrical or substantially cylindrical in shape, having a bottom surface 21, a top surface 22, and a cylindrical or substantially cylindrical, circumferential surface 23. To control the positioning of the artificial satellite 20 and to provide power for its operation, a power source, e.g., a plurality of solar power cells 24, is structured and arranged about the circumferential surface 23 and on the top and bottom surfaces 22 and 21 of the artificial satellite 20. For reasons discussed in greater detail below, a partitioned power source is advantageous.

To determine the inertial attitude of the artificial satellite 20, an optical sensor 26, such as a star tracker, an Electron Bombarded Charge Coupled Device (EBCCD), an Electron Bombarded Complementary Metal-Oxide-Semiconductor (EBCMOS), and the like, is structured and arranged on the artificial satellite with a restricted field-of-view 28. Advantageously, EBCMOS optical sensors 26 provide suitable resolution, small size, and radiation tolerance. Additionally, imaging arrays can be a EBCMOS system to reduce power needs further.

The optical sensor 26 of the attitude measurement system is adapted to detect relatively dim astronomical objects 17 and to obtain curved tracks of the astronomical objects 17, which can be used to determine the inertial attitude of the spin axis 29 of the artificial satellite 20. The optical sensor 26 is further structured and arranged to include imaging means providing a relatively-small, relatively-narrow field-of-view 28 (FOV).

By restricting the FOV 28, the size of the field and number of astronomical objects 17 that can be captured at the center of the optical sensor mosaic array (not shown) while the optical sensor 26 and/or the artificial satellite 20 rotate are reduced. Furthermore, the linear rates across the optical sensor mosaic array are smaller when the field of astronomical objects 17 are nearer the spin axis 29. Thus, when the FOV 28 is relatively small or narrow, the angular sensitivity is relatively large, providing better centroid measurement accuracy.

Advantageously, by restricting the FOV 28 to include a smaller pool of astronomical objects 17, a plurality of artificial satellites 20 can be deployed and adapted so that the optical sensors 26 determine the inertial attitude of each of the artificial satellites 20 using the same three astronomical objects 17. This provides a uniform, accurate, global inertial reference frame for the plurality of artificial satellites 20.

Figure 3:
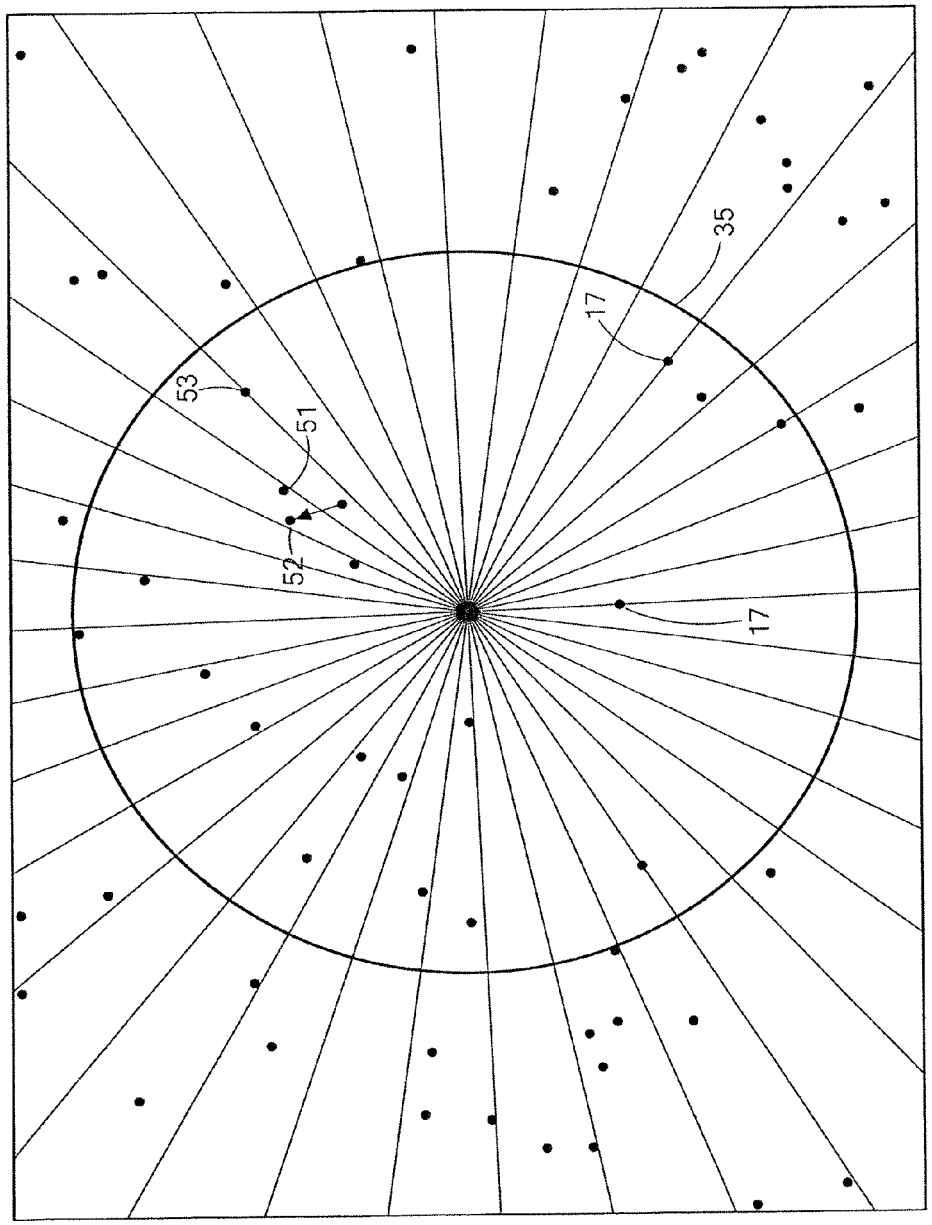
FIG. 3 is an illustrative representation of astronomical objects having a relative magnitude of 8 or higher that are located within two degrees of the Earth's ecliptic pole.

Notwithstanding the advantages of relatively small, linear rates, greater angular sensitivity, and better centroid measurement accuracy, when the FOV 28 is relatively small and relatively narrow, the optical sensor 26 must be able to detect relatively dim astronomical objects 17, i.e., having a relative magnitude 7 or fainter, especially if multiple astronomical objects 17 are required to determine the absolute attitude in inertial space as is the case with the present invention. This is shown illustratively in FIG. 3, which shows a plot of a four-degree (diameter) FOV 28. The circle 35 represents the FOV 28. The black dots represent astronomical objects 17 of intensity 7 or higher that rotate about the center 33 of the EBCMOS mosaic array. The EBCMOS mosaic array is a very-low-light level detector system that can easily detect relatively dim astronomical objects.

The number of astronomical objects 17 in the circle 35 is relatively small. This would reduce the memory requirements for a "star catalog" look-up table integrated into processing hardware/software that is included with or attached to the sensor 26.

The optical sensor 26 should be capable of identifying astronomical objects 17 regardless of their intensity. For example, with a small aperture of about two (2) centimeters, an EBCMOS sensor can detect relatively-dim astronomical objects 17. The EBCMOS optical sensor satisfies the requirements for being very small and light-weight and low power and has the added advantage of being insensitive to radiation effects, which is an important requirement for orbiting space components that may pass through the Van Allen Belts.

The system included a processor, for example an on-board computer or microprocessor, such as a UTMC 69 R000 16-bit RISC processor, attached to sensor 26. The system further includes sufficient non-volatile, read-only memory (ROM)

for storing data and application programs and volatile random access memory (RAM) for executing said programs. The application programs include, inter alia, programs for optical sensor control, programs for acquisition of astronomical object tracks, programs for radii-squared determination, programs for measuring the strength of the Earth's magnetosphere, programs for inertial attitude determination, programs for astronomical object identification, programs for updating optical sensors, programs for up-linking or down-linking with a terrestrial-based processor and the like.

U.S. Pat. No. 6,577,929 discloses detailed means and methods for determining the inertial attitude of an artificial satellite using a plurality, i.e., three, astronomical objects 17 and a high-sensitivity optical sensor 26, such as a star tracker. Briefly, to provide high scanning rates across the astronomical objects 17 and also to avoid a complex, gimbaled optical sensor, the optical sensor 26 is fixedly attached to the top surface 22 or bottom surface 21 of the artificial satellite 20. More specifically, the optical sensor 26 is fixedly attached to the top surface 22 or bottom surface 21 of the artificial satellite 20 at or very proximate to the spin axis 29.

Having described an optical sensor 26, a method for determining inertial attitude using the optical sensor 26 and associated processor will now be described. The inertial attitude of an artificial satellite 20 can be defined by the location and direction of the spin axis 29 of the artificial satellite 20 and by its roll angle. The location and direction of the spin axis 29 can be located using pitch and yaw coordinates, which, by convention, can be expressed in a right ascension (RA) and declination (DEC) coordinate frame, although any coordinate frame may be used. Obtaining the roll angle from the integrated spin angle is also relatively straightforward. More specifically, referring to FIG. 4A, for any instantaneous "snap-shot" 30 of known dim astronomical objects 17a, 17b, and 17c in a mosaic frame 35 taken at some point in time during the three-second revolution of the artificial satellite 20, the instantaneous roll angle is known. Moreover, roll rate is known from the previous "snap-shot" taken one period earlier. Thus, the roll rate is an absolute number that can be updated as often as every period, if necessary.

Figure 4B:
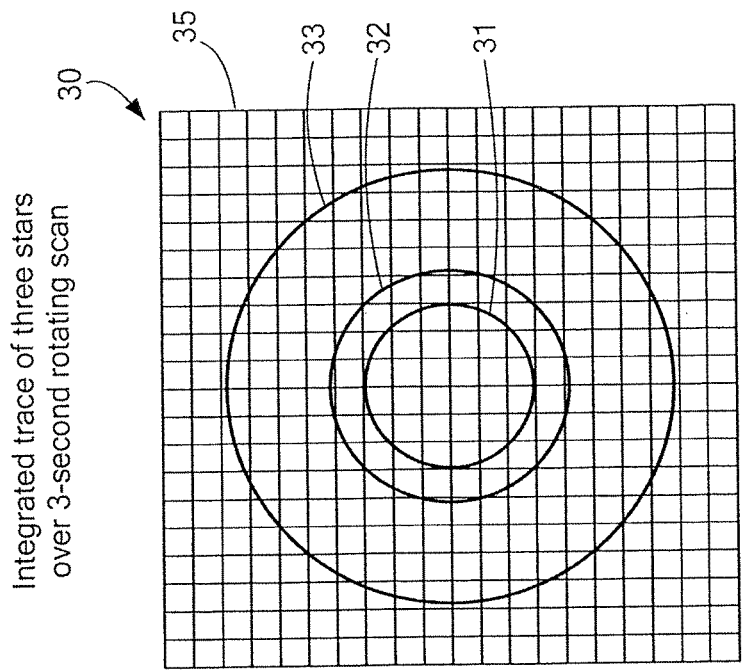
FIG. 4B is a diagram of integrated traces of the three stars in FIG. 4A during the three-second scan.
Figure 4A:
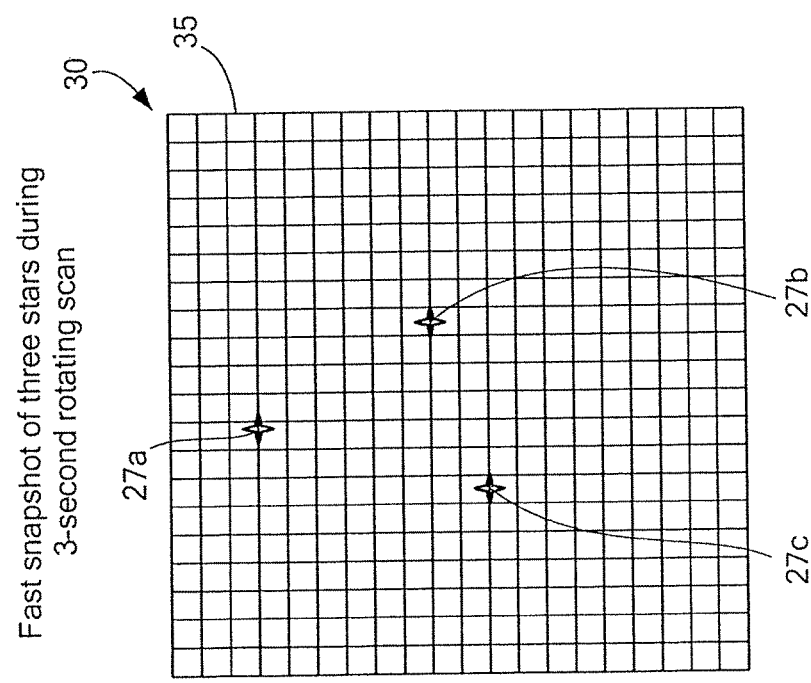
FIG. 4A is a diagram of a fast snapshot of three stars on a photosensor array during a three-second scan exposure.

Referring to FIG. 4A and FIG. 4B, U.S. Pat. No. 6,577,929 discloses calculating the inertial attitude of the spin axis 29 of an artificial satellite 20 by first determining a first radius $R_1$ of a substantially circular track 31 of a first astronomical object 17a; determining a second radius $R_2$ of a substantially circular track 32 of a second astronomical object 17b; and determining a third radius $R_3$ of a substantially circular track 33 of a third astronomical object 17c. The RA/DEC coordinates of the point of intersection the tracks of the three, non-co-linear astronomical objects 17a, 17b, and 17c of different radii correspond to the RA/DEC coordinates of the spin axis 29. A unique solution for the x- and y-coordinates, which correspond to the RA and the DEC, respectively, can be calculated using Equations (4) through (8) and/or Equations (14) through (20) of the Johnson, et al. patent, which are not repeated herein.

The Johnson, et al. method of determining the first radius $R_1$, the second radius $R_2$, and the third radius $R_3$, however, requires unnecessary calculation steps, e.g., taking the square root of a squared value, which require complex square root operations, resulting in additional time, additional memory and additional power. Therefore, according to the present invention, it is the squares of the first radius $R_1^2$, the second radius $R_2^2$, and the third radius $R_3^2$ that are actually needed in further calculations to determine the inertial attitude and, moreover, to control the positioning of the artificial satellite 20 accurately and in a stable fashion. Thus, the present approach saves time, memory, and power, which are critical to reducing size, weight, and power requirements of the relatively small artificial satellite 20.

U.S. Pat. No. 6,577,929 also discloses a method of determining the roll angle of an artificial satellite 20. The method uses the inertial attitude (RA/DEC) of the spin axis 29 to first identify one or more of the astronomical objects 17a, 17b, and/or 17c, which are the source of the star tracks 31, 32, and 33. Once one or more of the astronomical objects 17a, 17b, and/or 17c has/have been identified, the roll angle of the artificial satellite 20 can be determined by methods known to one of ordinary skill in the art based on the RA/DEC coordinates of the spin axis 29 and on the coordinates of one or more identified astronomical objects 17a, 17b, and/or 17c.

U.S. Pat. No. 6,577,929, however, used a "Lost-In-Space" star identification algorithm to identify the limited number of dim astronomical objects 17a, 17b, and/or 17c that can be tracked in a relatively-narrow FOV 28. Basically, with no knowledge of inertial attitude at all, the astronomical objects 17a, 17b, and/or 17c in the FOV 28 can be analyzed geometrically to identify the unique pattern of the astronomical objects 17a, 17b, and/or 17c in the FOV 28. The angle of separation between astronomical objects 17a, 17b, and/or 17c, however, provides an angles-only measurement. If this unique angles-only pattern is not repeated anywhere else in the celestial sphere, then the absolute attitude is determined with certainty if a match is found in the on-board star catalog. However, if the angles-only pattern is not unique or found in the star catalog, then there can be redundancy and attitude uncertainty and no solution.

The algorithm that performs the "Lost-in-Space" task is very complex. On-board computer memory requirements are relatively large. The algorithm reliability is a complex function of vehicle parameters, e.g., attitude angle rate and optical parameters. According, the "Lost-in-Space" algorithm is not ideally suitable for a very small, very low-power, spinning, reliable, artificial satellite 20.

An alternative using the present invention is to actively deploy a spinning artificial satellite 20 from a carrier vehicle 100 (FIG. 2) in such a way so that the spin axis is aligned within a narrow region of the celestial sphere, e.g., within about ten degrees and, preferably, within about five degrees, of the ecliptic pole. Such deployment techniques are relatively well developed and have been performed for several of NASA space missions. By initially positioning the spin axis 29 of the artificial satellite 20 within about ten (or five) degrees of the ecliptic pole and, further, by narrowing the FOV 28 to just a few degrees, the available astronomical objects 17 for use in determining inertial reference are drastically reduced. Thus, a smaller "look-up" table or "star catalog" located in memory in the on-board processor is needed.

The absolute attitude determination can then be calculated using a limited number of relatively dim astronomical objects 17 that are located within about ten or, preferably, within about five degrees of the ecliptic pole. Furthermore, as shown graphically in FIG. 5, by taking a statistical, e.g., histogram, approach to the limited number of relatively dim astronomical objects 27 that are observed during each revolution of an artificial satellite 20, "preferred" astronomical objects 17a, 17b, and 17c corresponding to the most frequently occurring squared-radii can be used.

In yet another alternative method for determining the location of the spin axis 29, the existing integrated circular traces 31, 32, and 33 of the several dim astronomical objects 17a, 17b, and 17c can be analyzed using the EBCMOS mosaic array. For example, by measuring the x and y components of the radii of the several concentric circles and using the right ascension and declination of the specific dim astronomical objects 17 close to the normal to the ecliptic plane 15, a unique solution can be obtained for the absolute spin axis location.

The measurement of the x and y components of the multiple repeated radii during a circular trace by the EBCMOS mosaic array provides an extremely accurate estimate of each radius. Indeed, the effects of random angle measurement errors can be reduced by averaging. The intensity of the dim astronomical objects 17 does not need to be measured. The intensity only has to be high enough to be detected on the EBCMOS mosaic array of sensor 26 and the calculated radii-squared processed by the histogram method.

If there is still a problem identifying the dim astronomical objects 17, then there is yet a third option that measures the relative intensities of the dim astronomical objects 17 based on the integrated intensity signals obtained during one circular rotation on the EBCMOS mosaic array. An advantage of this intensity integration process is that non-uniform responsivity errors from pixel-to-pixel on the EBCMOS mosaic array is "averaged out". Thus, depending on the number of dim astronomical objects 17 contained in the on-board "star catalog", i.e., memory, and the number of dim astronomical objects 17 integrated in the circular rotation, the identity of the astronomical objects 17 can be determined by the relative star intensities (an accurate intensity-only measurement). Once the dim astronomical objects 17 in the FOV 28 are identified, the absolute angle to the spin axis 29 can be measured.

Updating the absolute roll, pitch, and yaw continuously for every sampling period, however, is not necessary. The external torques acting on the artificial satellite 20 are relatively small. Hence, there should be no significant change in absolute inertial attitude for many sampling periods.

Moreover, based on a 20 RPM spinning rate, a sampling interval during a three-second circular scan may only be required about once every five minutes. Consequently, the average power of the star tracker subsystem over the five-minute period is reduced from the instantaneous power of the star tracker system by about two orders of magnitude [3 seconds/(5 minutes×60 seconds/minute)=0.01]. Accordingly, for example, if the star tracker system draws 7 Watts of instantaneous power for just three seconds every five minutes, then the average power over the five minute interval is only about 0.07 Watts. This meets the ultra-low-power objective for the attitude control and measurement system for the spinning, artificial satellite 20.

When the artificial satellite 20 experiences relatively large torques which may occur during atmospheric disturbances or for example, during internal boom 25 deployments, the five-minute measurement interval can be shortened appropriately, causing a relative increase in average power. These disturbances, however, are typically not continuous so the measurement interval can usually revert back to the low-to-average-power mode when the temporary disturbance is over.

The Inertial Attitude Control System

An inertial attitude control system for periodically or continuously controlling the roll, pitch, and yaw of an artificial satellite will now be described. The disadvantages of using a suite of inertia-sensing, instrument gyroscopes and propulsion means for controlling the inertial attitude as proposed by Johnson, et al. have been discussed previously above.

The use of the Earth's magnetosphere for inertial attitude control of a spinning satellite was described by E. I. Ergin and P. C. Wheeler in "Magnetic Attitude Control of a Spinning Satellite" published in the Journal of Spacecraft, Vol. 2, No. 6 (Feb. 17, 1965). However, Ergin and Wheeler did not address accurate attitude determination and/or a relatively small, relatively light weight, ultra-low power, real-time, autonomous control system.

The inertial attitude control system of the present invention expands on determining inertial attitude using a star tracker and controlling an artificial satellite using the torque produced by the interaction between an electromagnetic field proximate to the artificial satellite 20, e.g., an electromagnetic field caused by current flowing through a plurality of current-carrying loops, and an ambient magnetic field, i.e., the Earth's magnetosphere 12. Such a system, however, requires an internal or, more likely, an external magnetometer 27 for directly measuring the Earth's magnetic field 12 at any desired point in time. In some artificial satellite 20 applications, for example, when the artificial satellite is a ballistic missile, adding and/or having to deploy an external magnetometer 27 may be undesirable.

In such instances, in lieu of a magnetometer 27, the artificial satellite 20 can include, instead, a virtual model of the Earth's magnetosphere 12, e.g., an application program, by which the strength of the magnetic field can be estimated given an instantaneous inertial attitude obtained from the launch vehicle 100. Such an application program, however, may require additional memory storage space and power.

Alternatively, the artificial satellite 20 can include means for instantaneously back-calculating the strength of the magnetic field by measuring the rate of precession of the artificial satellite 20 caused by a pre-determined electromagnetic field proximate the artificial satellite 20. Although the invention will be described hereinafter using a magnetometer 27 to measure the strength and polarity of the Earth's magnetosphere 12, those skilled in the art can appreciate the principles taught herein to apply them to the alternative means for measuring the same.

At an optimum spin axis (attitude) location (x,y) in the RA/DEC coordinate frame, in which the determinant $(x_j, y_k)$ equals $(RA_i, DEC_j)$ where i=1, 2, 3; j=1, 2, 3; and k=1, 2, 3, changes in RA, i.e., $\Delta x$, and in DEC, i.e., $\Delta y$, are defined by the following equations:

$$\Delta x=(1/D)*[\Delta M_1(R_i^2)*(y_3-y_1)-\Delta M_2(R_i^2)*(y_2-y_1)] \quad \text{Eqn. (1)}$$

and $$\Delta y=(1/D)*[\Delta M_2(R_i^2)*(x_2-x_1)-\Delta M_1(R_i^2)*(x_3-x_1)] \quad \text{Eqn. (2),}$$

where:
D is equal to the determinant $(x_j, y_k)$;
The matrix M is $M(Ri^2, x_j^2, y_k^2)$ $$R_i^2=x_i^2+y_i^2; \quad \text{Eqn. (3),}$$

where $(x_i, y_i)$ correspond to the coordinates of an astronomical object of interest (assuming the center of the array is defined as zero (0,0);

$$M_1 \text{ is equal to } (1/2)(R_1^2-R_2^2+x_2^2-x_1^2+y_2^2-y_1^2)^2; \text{ and} \quad \text{Eqn. (4)}$$

$$M_2 \text{ is equal to } (1/2)(R_1^2-R_3^2+x_3^2-x_1^2+y_3^2-y_1^2)^2 \quad \text{Eqn. (5).}$$

Once the squared radii of the three astronomical objects have been used to establish the optimum inertial attitude of the spin axis, they essentially become "fixed" or constant. Hence, Equations (1) and (2) can be further simplified to the following:

$$\Delta x=c_{x1}*\Delta(R_1^2)+c_{x2}*\Delta(R_2^2)+c_{x3}*\Delta(R_3^2); \text{ and} \quad \text{Eqn. (5)}$$

$$\Delta y=c_{y1}*\Delta(R_1^2)+c_{y2}*\Delta(R_2^2)+c_{y3}*\Delta(R_3^2) \quad \text{Eqn. (6)}$$

where $c_{xi}$, and $c_{yi}$, are constants (i=1, 2, 3). In short, correctional changes in RA and DEC are proportional to the squares of the three radii ($R_1^2$, $R_2^2$, and $R_3^2$), which are defined by the Pythagorean Theorem in Equation (3) above. The linearity of Equations (5) and (6) facilitates a closed-loop, real-time solution to control and maintain the desired inertial attitude of the spin axis of the artificial satellite 20.

Figure 6A:
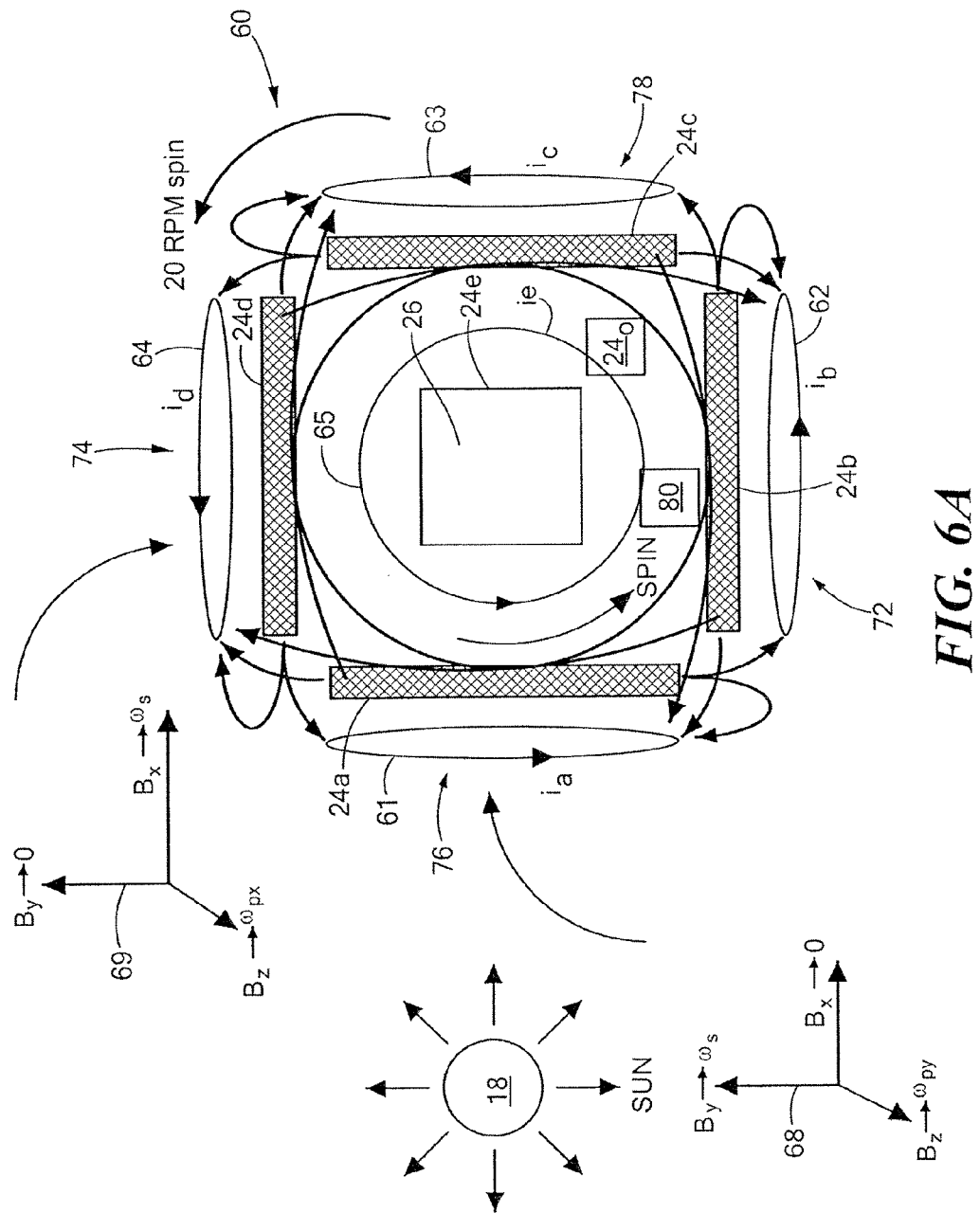
FIG. 6A is a plan view of a diagram of an attitude correction system for an artificial satellite in accordance with the present invention.
Figure 6B:
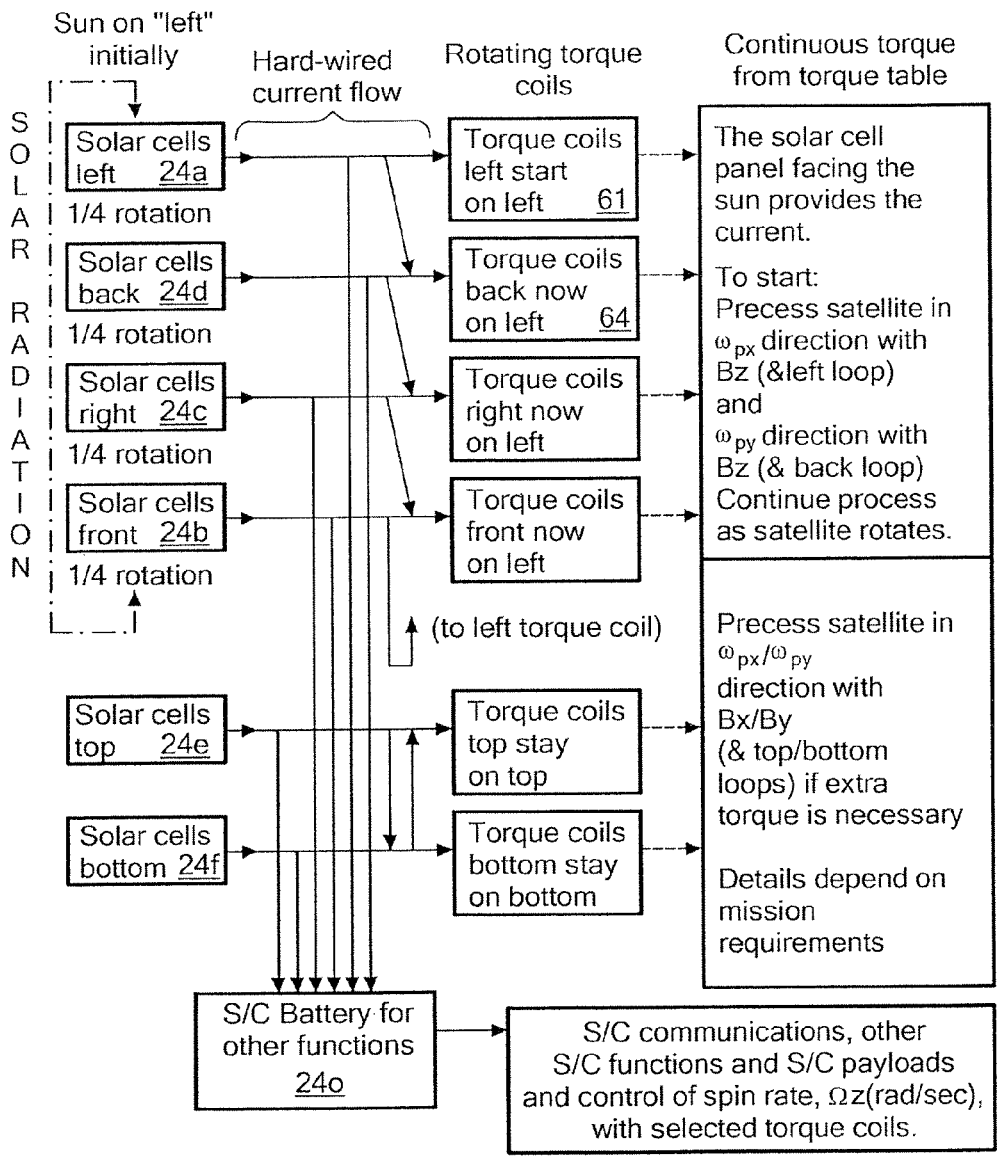
FIG. 6B is a diagram for a hard-wired, control system for an attitude correction system in accordance with the present invention.
Figure 6C:
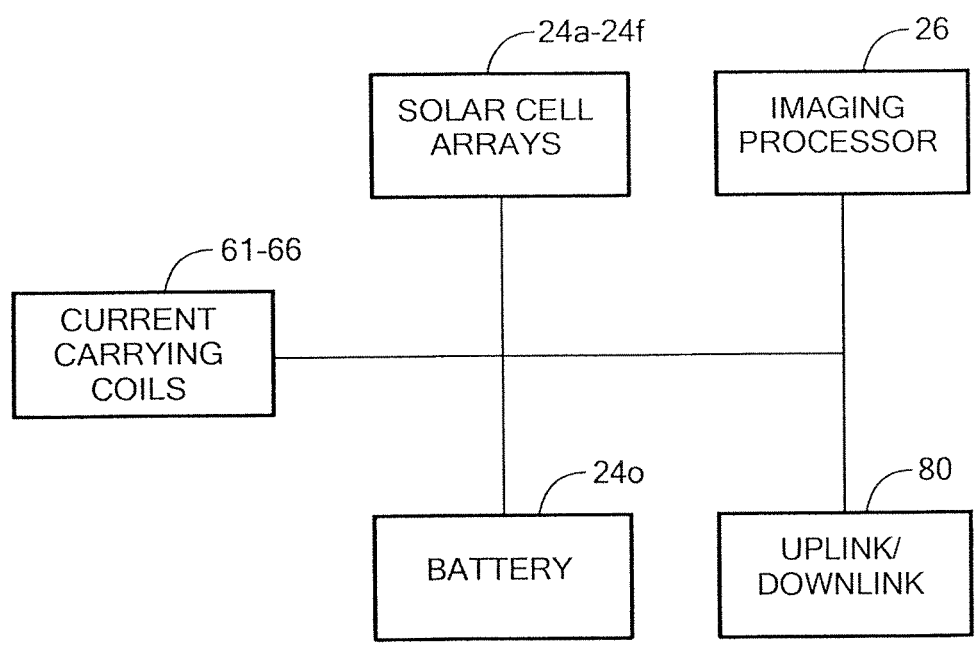
FIG. 6C is a block diagram of an attitude control system 60 an in accordance with the present invention.

FIG. 2 and FIGS. 6A through 6C show diagrams of the attitude control system 60 of an artificial satellite 20. FIG. 6A shows a diagram of a plan view of an artificial satellite 20 taken from the top surface 22. FIG. 6B shows a diagram of a hard-wired attitude control system 60. FIG. 6C shows a block diagram of the attitude control system 60 of an artificial satellite 20. FIG. 2 shows a perspective diagram of a side view of the same taken from the "front" 72 of the artificial satellite 20. For convenience, the terms: "front" 72, "rear" 74, "left" 76 and "right" 78 portions of the artificial satellite 20 will be used to refer to the current-carrying loop and solar-cell panel that are disposed in those positions, which are defined below and in FIG. 6A.

According to eponymous laws credited to Messrs. Ampere and Maxwell, when an electromagnetic field produced by flowing current (I) passes through an ambient magnetic field (B), force, e.g., a directional torque (T), is generated that, mathematically, is equal to the cross product of the current (I) vector and a magnetic field (B) vector or:

$$T = I \times B \qquad \text{Eqn. (7).}$$

sphere 12 is periodically or continuously sensed by the magnetometer 27, then Ampere and Maxwell teach us that the attitude of the artificial satellite 20 can be controlled by applying directional torque to precess the artificial satellite 20 in a desired direction in the x-, y- and/or z-direction. Similarly, Ampere and Maxwell teach us that the strength and polarity of the ambient magnetic field (B) can be back-calculated by measuring the precession of the artificial satellite 20 for a known current.

As a result, controlling the magnitude, or amount, of flow and/or the direction of current ia, ib, ic, id, ie, and if through a plurality of torque-producing devices, e.g., a plurality of orthogonal, rotationally symmetric, current-carrying loops 61-66 (FIG. 6A and FIG. 2), disposed on a spinning, artificial satellite 20 passing through the Earth's magnetosphere 12 can be used to adjust the inertial attitude of the artificial satellite 20 in a linear, real-time, autonomous, closed-loop format that does not require control input from a terrestrial-based processor.

A dimensional analysis of the gyroscopic precession equation is shown below. The dimensional analysis further shows that a two degree precession requires about 6.2 hours to correct.

Gyroscopic Precession Equation:

---

$\bar{T} = \bar{\omega}_p \times \bar{L}$      vector cross product (assume orthogonal relationship)
         T    is the applied torque (from current loop)
         $\omega_p$    is the resultant desired precession rate
         L    is the angular momentum of the small spinning satellite $\omega_p = \dfrac{T}{L}$      $L = I \omega_s$   where I = moment of inertia about spin axis and $\omega_s$ is the spin rate (20 RPM)

1 amp is a reasonable number for a 100 cm² Si solar cell
sunlight = 1000 watts/m²

$T = BiA$   from current loop in magnetic field B
i = required current from solar cell array (assume i = 1 amp from solar cell array)
$A \sim \pi R^2$   A = area of current torque loop
$I \sim MR^2$   M = mass of satellite ~ 50 kg
R = radius of satellite ~ 1/3 meter Earth's magnetic field near surface:
$B = 50 \times 10(-6)$ Tesla $= 50 \times 10(-6)$ N/amp-m
N = newton (unit-of-force)

$\omega_p = \dfrac{BiA}{I\omega_s}$    note that when $I\omega_s$ is <u>relatively</u> small (small satellite @ 20 RPM) then $\omega_p$ is <u>relatively</u> large (depending on B, i and A)

$$\omega_p = \dfrac{\cancel{50} \times 10(-6) \dfrac{N}{\cancel{amp}\text{-m}} \times 1 \cancel{amp} \times \pi \cancel{R^2 \times m^2}}{\cancel{50} \text{ kg} \times \cancel{R^2 \times m^2} \times \dfrac{20 \cancel{rev}}{\cancel{min}} \times \dfrac{2\pi \text{ rad}}{\cancel{rev}} \times \dfrac{\cancel{min}}{60 \text{ sec}}}$$

$$\omega_p = \dfrac{1.5 \times 10(-6) \cancel{N} \text{-sec}}{\cancel{kg\text{-}m}} \times \dfrac{\cancel{kg\text{-}m}}{\dfrac{\text{sec}^2}{\cancel{N}}} \times \dfrac{60 \text{ deg}}{\text{rad}}$$

$$\omega_p = 9 \times 10(-5) \dfrac{\text{deg}}{\text{sec}} \text{ (for 1 amp)}$$

To get 2 degree precession, the required time (t) is:

$$2 \text{ degree} = \omega_p \times t = 9 \times 10(-5) \dfrac{\text{deg}}{\text{sec}} \times t$$

and t ~ 22,000 sec ~ 6.2 hours which is a relatively short time for long mission scenarios

---

As we know, the Earth's magnetosphere 12 produces an ever-changing, three-dimensional magnetic field (B) that can be represented by the three-dimensional vector equation $B = B_x i + B_y j + B_z k$. If the polarity, i.e., sign, of the Earth's magneto- Instantaneously calculating desired RA and DEC attitude corrections, i.e., $\Delta x$ and $\Delta y$, using optical sensor measurements of the squares of the radii of three astronomical objects 17 ($R_1^2$, $R_2^2$, and $R_3^2$) and measuring the polarity (sign) of the Earth's magnetic field 12 using magnetometer 27 measurements will enable one to generate gyroscopic precessions to make pitch, yaw, and roll corrections without the need of a suite of inertial sensors (gyroscopes) autonomously and in real-time. Moreover, linear, real-time, closed-form feedback enables driving to zero, or "nulling", the RA error and the DEC error and/or the change in RA and the change in DEC.

The artificial satellite 20 in FIG. 2 and FIG. 6A is rotating counter-clockwise about its spin axis 29, with a spin magnitude ($\omega_s$) of 20 RPM. Those skilled in the art can appreciate that the direction of spin and the spin rate are arbitrary and are used illustratively and not for the purpose of limitation.

The plurality of rotationally-symmetrical, current-carrying loops 61-66 are disposed orthogonally about the circumferential surface 23 of the artificial satellite 20 on the "left" 76, the "front" 72, the "right" 78, and the "rear" 74 portions thereof, on the top surface 22, and on the bottom surface 21, respectively. A plurality of power sources, e.g., current-generating, solar cell panels 24a-24f, are further disposed in combination with an associated current-carrying loop 61-66 on the "left" 76, the "front" 72, the "right" 78, and the "rear" 74 portions of the artificial satellite 20, on the top surface 22, and on the bottom surface 21. For example, partitioned solar cell panel 24a is disposed in combination with a first current-carrying loop 61 on the "left" portion 76, partitioned solar cell panel 24b is disposed in combination with a first current-carrying loop 62 on the "front" portion 72, and so forth.

The solar cell panels 24a-24f produce current (power) when exposed to the radiation of the Sun 18. The current is either stored in an on-board energy-storage device 24o, e.g., a battery, a capacitor, and the like, or is applied to at least one of the torque-producing, current-carrying loops 61-66 to provide desired gyroscopic precession to the artificial satellite 20 for the purpose of inertial attitude adjustment, all under processor control. Each solar cell panel 24a-24f is adapted to operate each of current-carrying loops 61-66. However, those skilled in the art can appreciate that it would be possible to provide inertial attitude adjustment by providing current to no more than two of the loops 61-66 by changing the direction of flow.

Detailed design of the solar cell panels 24a-24f and current-carrying loops 61-66 includes, without limitation: the size of the wire, the number of turns per loop, the wire resistance, the current capacity of the wire, the weight of the wire, and so forth, which are all within the knowledge of those of ordinary skill in the art. Using weight as the critical design feature, the inventor has optimized the weight of each partitioned solar cell panel and current-carrying loop at about 0.1 Kg, for a 1 amp capacity solar cell panel array.

During a three-second revolution about its spin axis 29, each of the partitioned solar cell panels 24a-24d will be exposed to the Sun 18 for approximately 0.75 seconds, and hidden from the Sun 18 for about 2.25 seconds. During the 0.75 second exposure time, current generated by the exposed solar cell panel 24, will be delivered to the energy-storage device 24o or to at least one current-carrying loop 61-66 in accordance with the following procedure.

As shown in FIG. 6A and FIG. 6B, for clarity and ease of discussion, during an attitude correction routine, the solar cell panel 24a positioned at the "left" 76 portion is assumed to always be exposed to the Sun 18 and the solar cell panel 24d positioned at the "rear" 74 portion will be the next panel to assume the "left" position 76 and be exposed to the Sun 18. Because the artificial satellite 20 is spinning, the solar cell panel 24 physically located in the "left" 76 and "rear" 74 positions will always be changing. Thus, regardless of which physical solar cell panel 24a-24d or which associated current-carrying loop 61-64 occupies the "left" 76 portion during its 0.75 seconds of exposure, that discrete solar cell panel 24, hereinafter the "left" solar cell panel 24a generates current, which is distributed as described in greater detail below.

The method of controlling inertial attitude of a spinning, artificial satellite 20 uses torque to provide gyroscopic precession in an x-, y-, and/or z-direction and to provide spin axis attitude adjustments, and uses angular momentum to make passive spin attitude stabilizations. If, the spin vector precession components corresponding to the desired changes in RA and DEC, i.e., $\Delta x$ and $\Delta y$ from Equations (5) and (6), are represented by $\omega_{px}$ and $\omega_{py}$, then there are four possible precession correction combinations. See Table I below.

TABLE I

| CASE | REQUIRED CORRECTION | |
|---|---|---|
| | $\omega_{px}$ | $\omega_{py}$ |
| (a) | + | + |
| (b) | + | − |
| (c) | − | + |
| (d) | − | − |

For the sake of brevity and to avoid unnecessary redundancy, attitude correction will be described for a CASE (c) correction in which spin axis attitude control requires negative pitch gyroscopic precession ($\omega_{px}$) and positive yaw gyroscopic precession ($\omega_{py}$).

Referring to FIG. 6A, the effect of the magnetic field (B) on "left" portion 76 of the artificial satellite 20 is shown by reference number 68 and the effect of the magnetic field (B) on "rear" portion 74 of the artificial satellite 20 is shown by reference number 69. The effects of the magnetic field (B) on "top" 65 and "bottom" 66 portions of the artificial satellite 20 are not shown purposely. However, those skilled in the art can appreciate that the process taught herein for controlling the artificial satellite 20 using only the current-carrying loops 61-64 disposed on the circumferential surface 23 of the artificial satellite 20 can also be used to control the artificial satellite 20 using current-carrying loops 65 and 66 as well. The process, however, is more involved and would require more memory space and longer calculations—neither of which is desirable or necessary. Thus, it is preferred that only the current-carrying loops 61-64 disposed on the circumferential surface 23 of the artificial satellite 20 are used to make pitch and yaw corrections.

Assuming that, initially, the magnetic field in the z-axis ($B_z$) has a positive polarity, current flowing through current-carrying loop 61 in the direction shown, will provide a positive yaw gyroscopic precession and current flowing through current-carrying loop 64 in the direction shown, will provide a positive pitch gyroscopic precession. For Case (c), positive yaw gyroscopic precession is desired but positive pitch gyroscopic precession is not.

Accordingly, to provide the correct torque for producing the desire gyroscopic precession, current generated by the solar cell panel 24a in the "left" portion 76 is provided to a current-carrying loop pair in the "left" 76 and "front" 72 portions, i.e., current-carrying loops 61 and 62, which is to say, to current-carrying loop 61 for positive yaw gyroscopic precession and to current-carrying loop 62 for negative pitch gyroscopic precession. Those skilled in the art can appreciate that, alternatively, the direction of current to that shown in FIG. 6A could be reversed, to provide the desired gyroscopic precession, e.g., in current-carrying loop 64 in the "rear" 74 position. For Case (c), current will continue to be applied to current-carrying loop pair in the "left" 76 and "front" 72 portions, i.e., current-carrying loops 61 and 62, until the optimum inertial attitude, i.e., optimum RA and optimum DEC, is achieved or until the polarity (sign) of the magnetic field 12 in the z-axis ($B_z$) changes. When optimum inertial attitude is reached, no further corrections for pitch or yaw are necessary so no current will be provided to any current-carrying loops 61-66. Instead, current can be provided to the energy-storage device 24o.

When the polarity (sign) of the magnetic field in the z-axis ($B_z$) changes, then a current-carrying loop pair associated with the "right" 78 and "rear" 74 portions, i.e., current-carrying loops 63 and 64, will provide the desired corrective gyroscopic precession for a case (c) correction. The polarity (sign) of the magnetic field 12 in the z-axis ($B_z$) should be positive for half of the orbit of the artificial satellite 20 about the Earth 10 and negative for the other half of the orbit. As a result, the spin frequency of the artificial satellite 20 provides a beneficial method to sequence the current through desired torque-producing, current-carrying loops 61-66, to maintain a potentially continuous or near-continuous current flow to appropriate current-carrying loop pairs without switching every three seconds. Only when the sign of the magnetic field in the z-axis ($B_z$) flips, i.e., from positive to negative or from negative to positive, is switching from one current-carrying loop pair to another necessary.

In short, instead of switching during every 3-second revolution, switching occurs at every one-quarter or every one-half orbit which can be 22.5 minutes and 45 minutes, respectively. This provides a substantial simplification of the amount and frequency of switching that would take place during a long mission. Thus, the reliability of the method is improved.

Referring to FIG. 7, a block diagram showing linear, closed-loop feedback for initially controlling gyroscope precession of a spinning artificial satellite 20 during an acquisition stage is shown. The process shown in the block diagram would be embodied as an application or a driver program that is executable on the inertial attitude processor. The attitude determination for the star tracker processor, or, alternatively from an uplinked attitude initialization, is the input. The switch configuration described above is the and output.

Briefly, the RA and DEC of the artificial satellite are measured (STEP 1). Initial "measurement" in this sense can include measurement of RA/DEC using the squares of the radii of three astronomical objects 17 ($R_1^2$, $R_2^2$, and $R_3^2$); or via an uplink from a terrestrial-based processing device (not shown) when an approximate RA/DEC attitude are known based on satellite booster/launcher attitude information.

Figure 5:
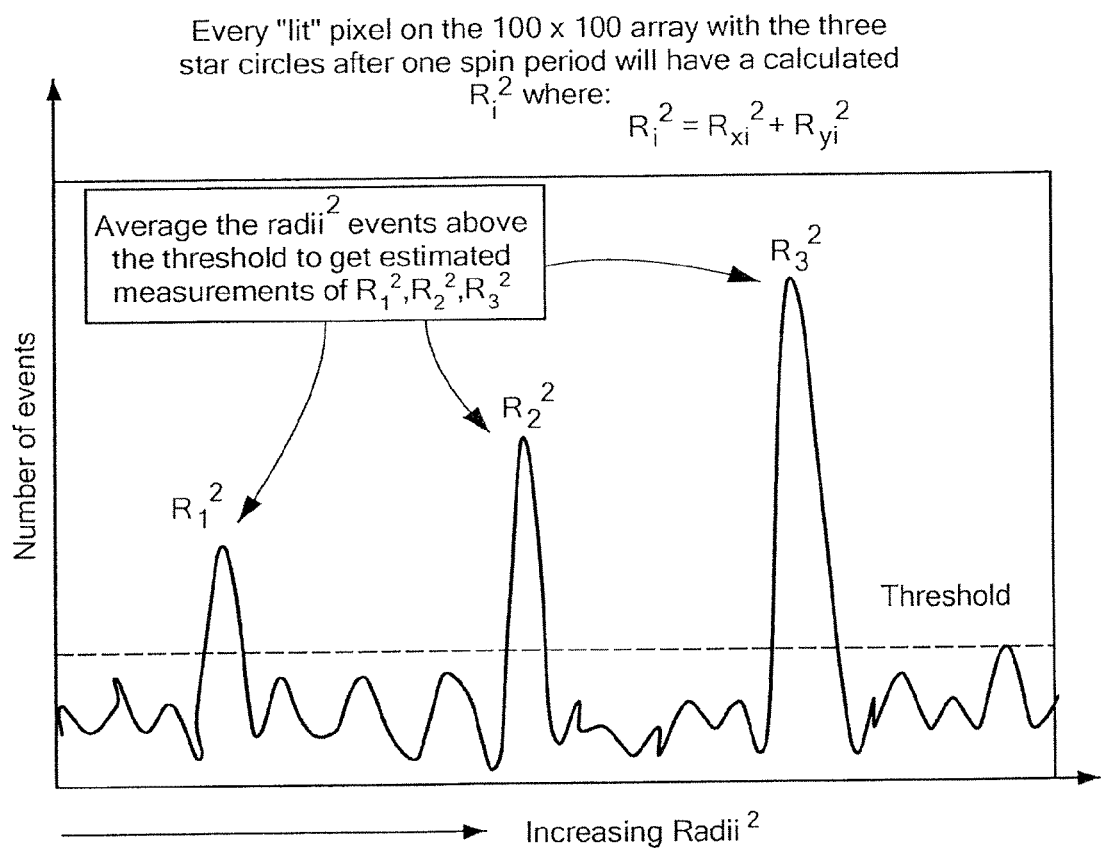
FIG. 5 is a representative histogram showing the three most prevalent stars from a plurality of snapshots.

When the RA and DEC of the artificial satellite 20 are calculated using the squares of the radii of three astronomical objects 17 ($R_1^2$, $R_2^2$, and $R_3^2$), as discussed above and as shown in FIG. 7, using an optical sensor 26 with a narrow FOV 28 that selects optimum astronomical objects 17 that are near the ecliptic pole, e.g., less than about 10 degrees, is desirable. More desirable is using the optimum three astronomical objects 17 as shown in FIG. 5.

Because the artificial satellite 20 is provided with an uplink/downlink capability 80 to a terrestrial-based processing device, the terrestrial-based processing device can be adapted to over-ride the "optimum" astronomical objects 17, if necessary or desirable.

The calculated, or measured, RA and DEC are then compared to optimum RA and DEC values (STEP 2). The comparison produces an error, i.e., an RA (error) and a DEC (error), from which, based on the sensed polarity (sign) of the magnetic field, pitch and yaw precession vectors (in the x- and y-direction, respectively) are calculated to null the error (STEP 3).

Current generated by the solar cell panel 24a in the "left" portion of the artificial satellite 20 is delivered to an appropriate current-carrying loop pair (STEP 4) to produce the desired gyroscopic precession or, alternatively, to an energy-storage device 24o.

Once the corrective gyroscopic precession is completed or nearly completed (STEP 4), the squares of the radii of three astronomical objects 17 ($R_1^2$, $R_2^2$, and $R_3^2$) are then re-calculated (STEP 5) and STEPS 1-5 are repeated. This feedback process continues until the RA error and DEC error are equal to zero.

Figure 8:
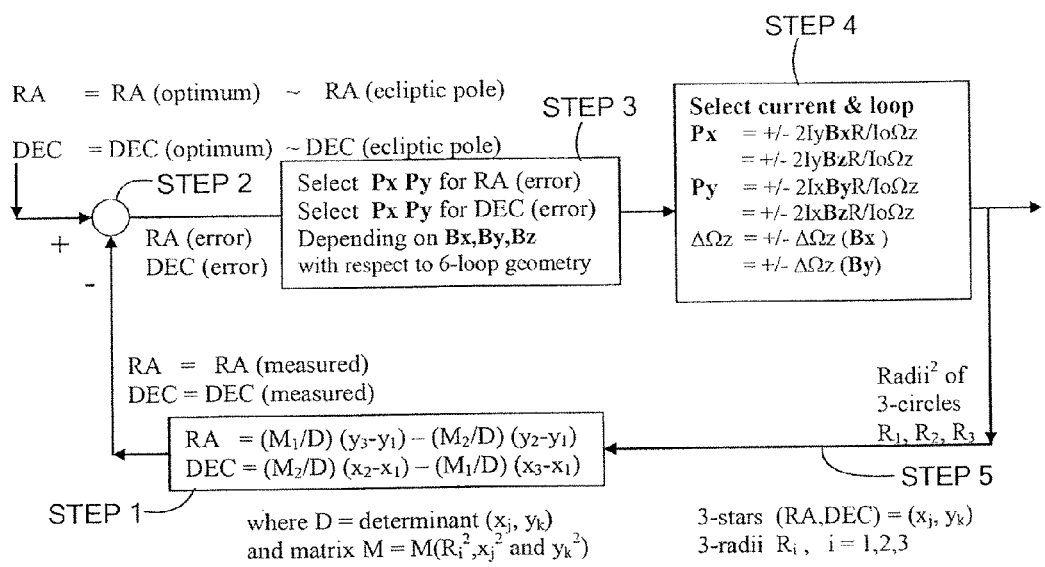
FIG. 8 is a block diagram of an initial, acquisition mode method of controlling the inertial attitude of an artificial satellite using linear, closed-loop feedback, to move the spin axis to a desire inertial attitude, in accordance with the present invention.
Figure 9:
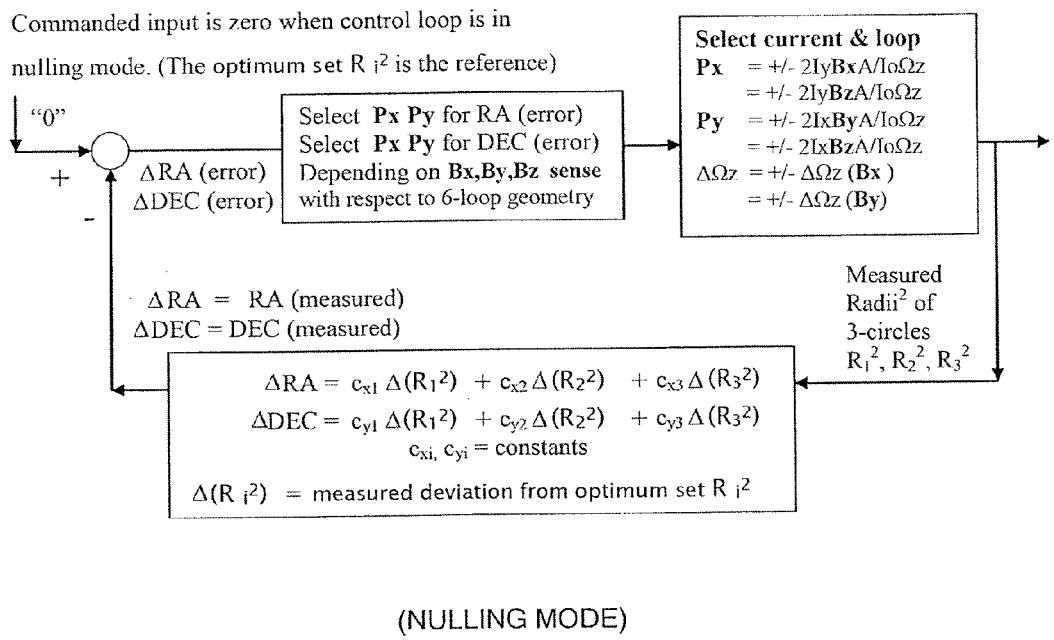
FIG. 9 is a block diagram of a final, nulling mode method of controlling the inertial attitude of an artificial satellite using linear, closed-loop feedback similar to FIG. 8, to null the spin axis on the desired location, in accordance with the present invention.

FIG. 8 shows a slight variation of the block diagram in FIG. 7. The block diagram in FIG. 8 is also for linear, closed-loop feedback for controlling gyroscope precession of a spinning, artificial satellite 20 via a nulling mode. Whereas the previous method measured RA and DEC and made gyroscopic precession corrections based on a comparison of the measured RA/DEC and an optimum RA/DEC, the method shown in FIG. 8 makes gyroscopic precession corrections based on measuring a desired change in RA/DEC, i.e., $\Delta$RA and $\Delta$DEC, and nulling the same.

In some embodiments, the functionality of the methods described above can be implemented as application programs or driver programs, e.g., software, that are executable on a processing device, such as a processing device. The processing device can be separate from, detachable from, or integrated into an attitude measurement and/or control system.

Although the system and methods of the present invention have been described in sufficient detail assuming that the Earth's magnetosphere is measured, the magnetometer 27 and boom arm 25 can be deleted altogether and replaced by a virtual model of the Earth's magnetosphere 12 that can be stored in memory accessible by the system's processing device. Alternatively, measurement of the Earth's magnetosphere 12 can be replaced by using the optical sensor 26 to provide precession data, from which the polarity (sign) of the Earth's magnetosphere 12 can be back-calculated using the rate of precession change.

In some applications, which is to say for some missions, it may be desirable to increase or reduce the spin rate and/or to stop the artificial satellite 20 from spinning altogether, e.g., to provide a three-axis stabilized system or a plurality of three-axis stabilized systems that are flying in formation. In such instances and applications, the selected torque-producing, current-carrying loops can be controlled by the on-board processor as described above and as shown in FIG. 6B, to retard or accelerate the spin rate.

The spin rate accelerate/decelerate capability would require minimal changes to the features or capabilities of the system described above. An accelerate/decelerate computer algorithm would be required.

However, when the spin rate of the artificial satellite 20 is stopped altogether, the optical device 26 is no longer spinning. Hence, determination of inertial attitude would use a static measurement instead of using the three radii-squared approach. Notwithstanding, the optical device 26, i.e., the star tracer, can still be used to determine the static inertial attitude of the artificial satellite 20 and to provide attitude data to the on-board processor for making adjustments to correct the static inertial attitude of the artificial satellite 20.

When the artificial satellite 20 is not spinning, the energy-producing partitioned solar cell panels 24a-24f, which are no longer spinning at a satellite spin rate, would be adapted to automatically be sequenced at the satellite's slower orbital rate rather than its original, faster spin rate.

Accordingly, when the artificial satellite 20 is not spinning, the optical device 26 is still used to measure the x- and y-coordinates of each of the three astronomical objects 17 to form the three static radii-squared values to provide the static inertial attitude. Moreover, the on-board processor would be adapted to generate torque by interacting current with the Earth's magnetosphere 12, to maintain the three astronomical objects 17 at their fixed locations in the field-of-view 28.

Determining and controlling the inertial attitude of an artificial satellite 20 enables the accurate navigation function, and is critical to making artificial satellites 20 useful for providing pin-point data links between the orbiting satellites and terrestrial targets. These links can be used for military surveillance, commercial communication, scientific investigations, and the like. However, the simple, rigid, fixed, 90-degree spinning configuration, i.e., the horizon sensor line-of-sight is kept at approximately 90 degrees to the star sensor line-of-sight, i.e., its spin axis, does constrain the star/horizon measurements that enable the navigation function. However, this rigid 90-degree constraint of the star/horizon sensors does not impede either the accurate navigation function or the broad coverage desired from the spinning satellite system as shown in the following descriptions. The resulting rigid, spinning "navigation sextant", in which a horizon sensor line-of-sight is kept at approximately 90 degrees to the star sensor line-of-sight, i.e., its spin axis, is an important novel concept that enables simplicity, accuracy, and economics for the resulting spinning satellite system.

The preceding description assumes that the (satellite) spin axis is fixed, i.e., constrained, or, more specifically, the spin axis of the satellite is oriented to rotate parallel to or substantially parallel to the ecliptic pole with the satellite 20 orbiting near the Earth's equator within the ecliptic plane, i.e., ±23 of the equator. Such an orientation, however, is incapable of providing complete terrestrial coverage of the entire Earth, leaving the poles uncovered.

In some applications that require broad Earth coverage, however, it may be advantageous not to constrain the spin axis, i.e., oriented to the north ecliptic pole, and, more particularly, to structure and arrange the spinning satellite so that its spin axis is not always parallel or substantially parallel to the ecliptic pole. This is referred to as a controlled precession of the spin axis from 0 to 1 degree per day which is described in greater detail immediately below.

Laser Pointing/Tracking Function

An artificial spinning satellite 20 can also be equipped with a laser pointing/tracking means. The laser pointing/tracking can be used to provide accurate reference alignment of a plurality of deployed artificial surveillance and/or communication satellites and of their optical sensors. To that end, a common mosaic array of optical sensors can be used to detect a surveillance object and attitude reference objects with a high degree of accuracy.

Figure 10:
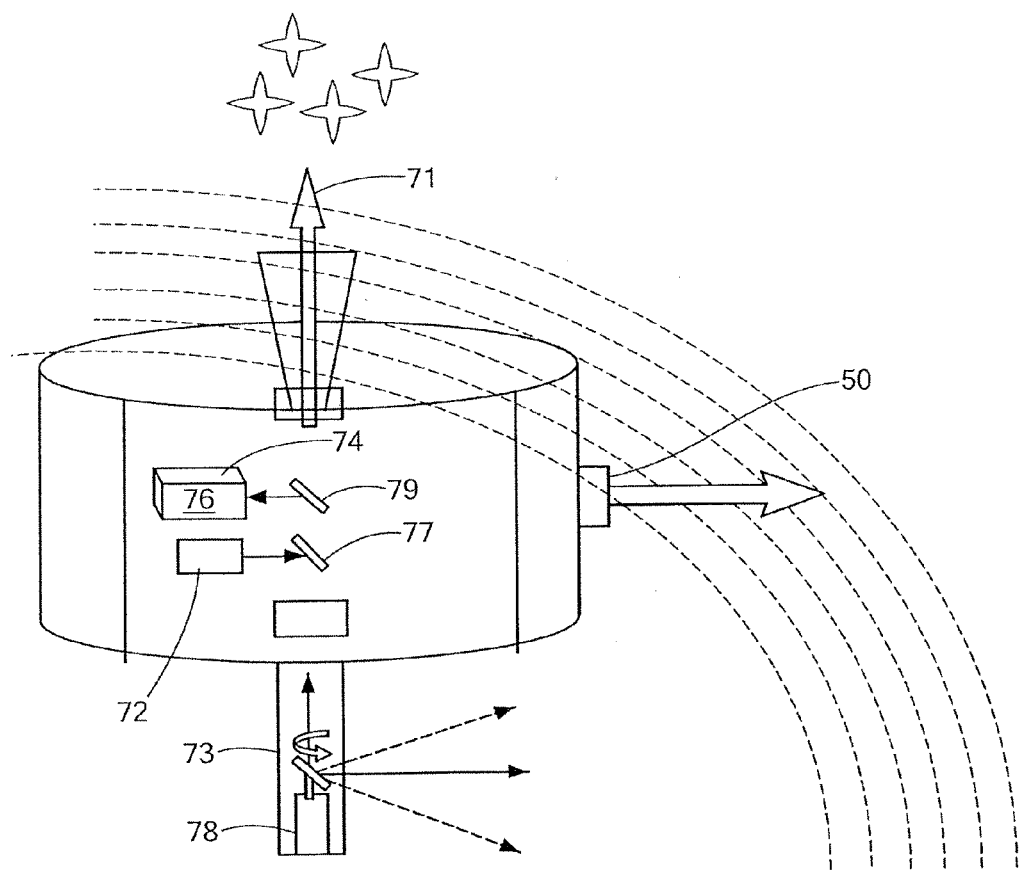
FIG. 10 shows a diagram of a spinning satellite having with an Earth horizon telescope and a laser transmitted/receiver.

Referring to FIG. 10, in pertinent part, a laser pointing/tracking function can be implemented using a laser transmitter/receiver 72, a common mosaic array of optical sensors 74, e.g., an electronic bombarded complementary metal-oxide semiconductor (EBCMOS) type optical sensor, and a controller 76. Such a system performing such a function enables navigation, pointing/tracking, communication, surveillance, and accurate alignment of a plurality of satellites 20 using a mosaic array sensor 74.

The components performing the laser pointing/tracking function are structured and arranged to receive and transmit wide bandwidth laser signals, respectively, from and to a terrestrial location (not shown). More particularly, the array of optical sensors 74 is structured and arranged to provide a narrow, e.g., one degree radius, field-of-view surveillance function for transmission to a specific terrestrial location(s) or to another satellite 20.

For that purpose, a beam expander/telescope 73 can be strapped down or otherwise attached to the exterior surface of the spinning satellite 20 along the optical axis 71. To minimize diffraction of the laser beam, the beam expander/telescope 73 can be adapted to use a two-inch aperture fully.

A beam splitter 77 that is optically coupled to the beam expander/telescope 73 along the optical axis 71 transmits image data to the array of optical sensors 74, which is then transmitted to the laser transmitter/receiver 72 for processing and transmission.

To further stabilize and control the orientation of the optical axis 71 of the laser transmitter/receiver 72, a counter-rotating mirror 78 is provided. The counter-rotating mirror 78 can be structured and arranged on the bottom face of the artificial satellite about the optical axis 71. The controller 76 is adapted to provide Vernier control signals that cause the mirror 78 to point at and, thereby, to direct the laser beam to any desired terrestrial target(s).

Beam splitters 77, 79 are optically coupled to the optical axis 71 of the laser transmitter/receiver 72, to the array of optical sensors 74, and to the laser transmitter/receiver 72. The beam splitter 79 enables simultaneous transmission of laser transmissions, e.g., wide bandwidth laser signals. For example, if a reply from the spinning satellite 20 is to be transmitted to a different ground station or to another orbiting satellite 20, the beam splitter 77 optically coupled to the laser transmitter/receiver 72 can propagate half, e.g., 50 percent, or substantially half of the signal to the counter-rotating mirror 78 shown and half of the signal to a second counter-rotating mirror (not shown) that is structured and arranged parallel to the spin axis 71. Thus, each counter-rotating mirror can independently relay the laser signal to separate and distinct locations. Other configurations within the knowledge of those skilled in the art can combine or split laser signals to and from multiple sources/destinations. The objectives are to expedite the transmission of laser signals and to form a laser network of laser communication.

Figure 11:
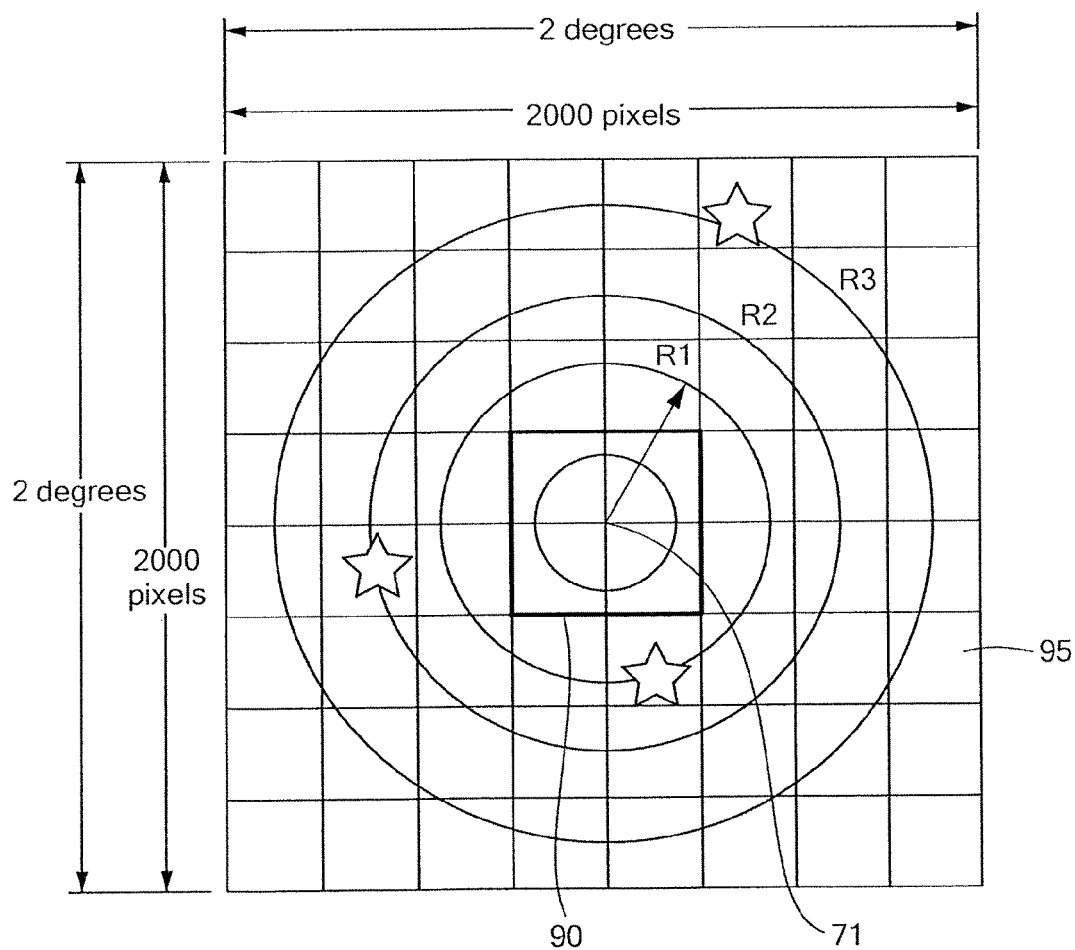
FIG. 11 shows a representative image of a common sensor array.
Figure 12:
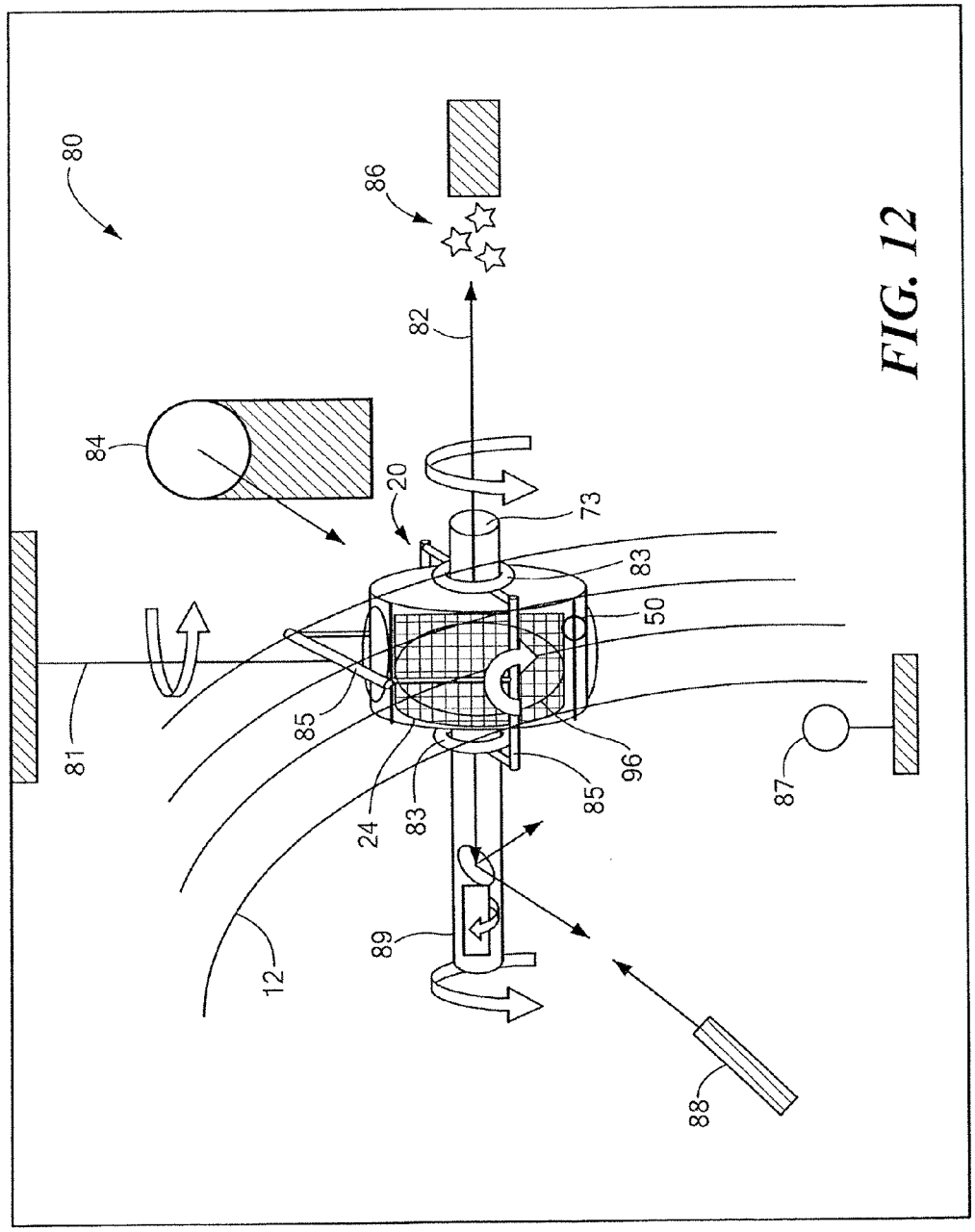
FIG. 12 shows a multi-functional ground laboratory environment in accordance with the present invention.

Referring to FIG. 11, a sensor array image 95 in which the radii R1, R2, R3 of the celestial bodies are outside of the quad-cell region 90 at the center of the sensor array image 95 is shown. The quad-cell region 90 can be used to drive the laser beam image from the laser receiver/transmitter 72 or from a ground source toward the optical axis 71 to stabilize the optical axis 71.

High Bandwidth Communication Link Function

Figure 13:
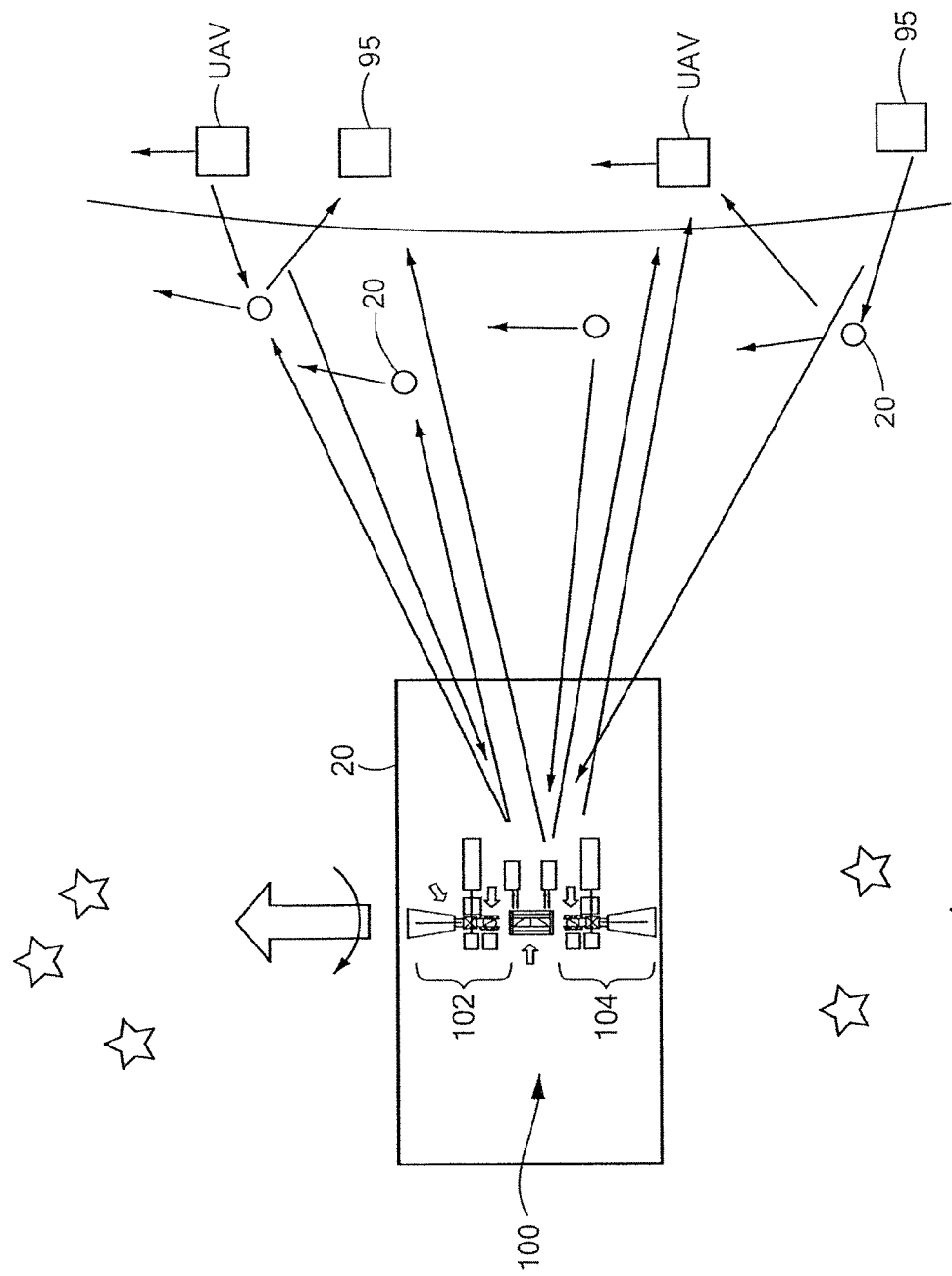
FIG. 13 shows a spinning satellite for use to provide high bandwidth communication links.

Referring to FIG. 13, spinning satellites 20 can be structured and arranged to provide a high bandwidth communication link function, e.g., to link a plurality of deployed satellites 20 to a plurality of terrestrial stations 95 or unmanned aerial vehicles (UAVs). Instantaneous, wide bandwidth communications between plural satellites 20 and/or terrestrial stations reduces the need for cumbersome, high capacity storage devices for storing communication data on-board and/or frees up available on-board data storage for possible scientific, military, and/or commercial applications.

In addition, during an up/down communication link through the atmosphere, the potential for atmospheric distortion to compromise the wide bandwidth communications performance exists. However, because of extremely accurate boresight alignment provided back-and-forth between the space-to-ground laser link(s), the principle of "reciprocity" can be used to measure the effect of atmospheric distortion, Moreover, the principle of "reciprocity" can mitigate atmospheric distortion effects by using the principles of adaptive optics compensation, which is well-known to the art.

The embodied satellite 20 includes back-to-back laser pointing/tracking means 100 that provide the attitude determination, communication, and laser pointing/tracking functions described above. At any given time, one of the back-to-back laser pointing/tracking means 102 operates in a receive mode while the other back-to-back laser pointing/tracking means 104 operates in a transmit mode. Advantageously, the satellites 20 can receive from and transmit to plural locations instantaneously, reducing substantial data storage requirements. Moreover, the redundancy of the back-to-back laser pointing/tracking means 100 can be confined to the small, low-power sensors, optics, laser transmitters, and the like while satellite support structure that performs attitude determination, control, power, and related functions does not have to be made redundant, which will avoid doubling the size, weight and/or power needs of the spinning satellite 20.

Figure 14:
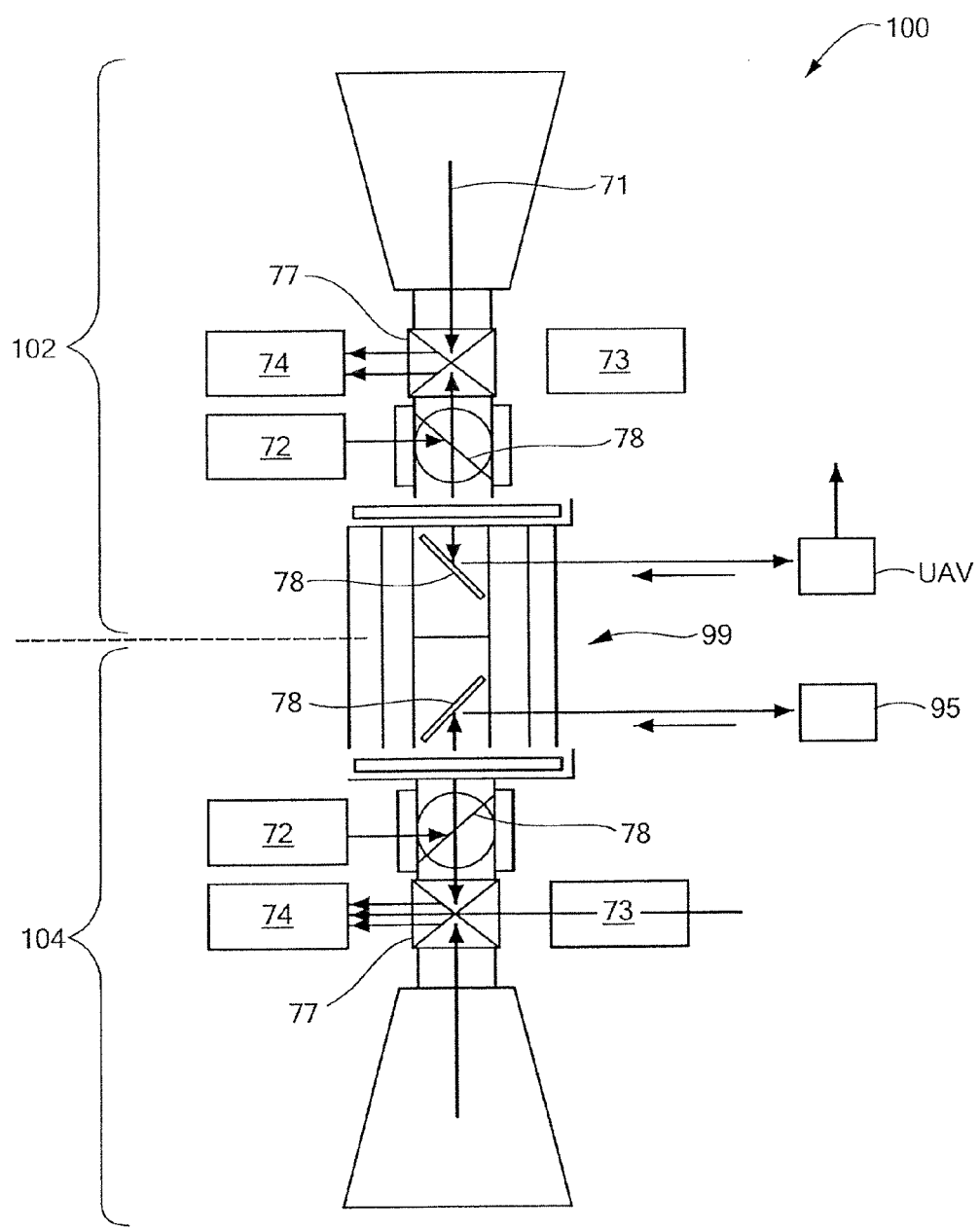
FIG. 14 shows a back-to-back configuration of the spinning satellite of FIG. 13.

Referring to FIG. 14, an illustrative back-to-back laser pointing/tracking means 100 is shown. Each of a first laser pointing/tracking means 102 and a second laser pointing/tracking means 104 includes a laser transmitter/receiver 72, a common mosaic array of optical sensors 74, and a controller 76, which have all been described above. Optionally, a single controller 76 that is adapted to control each of the first and second laser pointing/tracking means 102 and 104 can be used, to reduce weight, satellite size, and power requirements.

Beam expander/telescopes 73 can be strapped down or otherwise attached to the exterior surface of the spinning satellite 20 along an optical axis 71. Redundant beam splitters that are optically coupled to corresponding beam expander/telescopes 73 along the optical axis 71 transmit image data to corresponding arrays of optical sensors 74, which data are then transmitted to corresponding laser transmitter/receivers 72 for processing and transmission.

A counter-rotating mirror module 99 is also provided. The controller(s) 76 is/are adapted to provide discrete Vernier control signals that cause the mirrors 78 to point at and, thereby, to direct the laser beam to desired terrestrial 95 and/or celestial target(s) 20 and UAV.

Beam splitters 77 are optically coupled to the optical axis of corresponding laser transmitter/receivers 72, to corresponding arrays of optical sensors 74, and to corresponding laser transmitter/receivers 72. The beam splitters 77 enable simultaneous transmission of laser transmissions, e.g., wide bandwidth laser signals.

Optionally, size and weight permitting, sensing devices (not shown), such as photodiode sensors, can be disposed proximate to corresponding arrays of optical sensors 74, to process data from the lasers. The optional sensing device can be an analog device that is not limited by low frequency, e.g., 60 Hertz, operation, to expedite performance.

Although the terrestrial locations 95 can inter-communicate using free-space laser communication techniques through the atmosphere, in order to send and receive wide bandwidth optical data between terrestrial locations 95 and between satellite 20 under all weather conditions, terrestrial locations 95 can be coupled to one another using a fiber optic land line.

Although the invention has been described in connection with transmitting and receiving laser signals to and from terrestrial and celestial targets, the terrestrial targets do not have to be at a pre-determined or fixed location or, necessarily, disposed on the Earth's surface. For example, the pointing/tracking means 100 of the present invention can be used to provide communication with and between at least one unmanned aerial vehicle (UAV), or drone, on the ground or in flight.

Controlled Precession Embodiment

Figure 15:
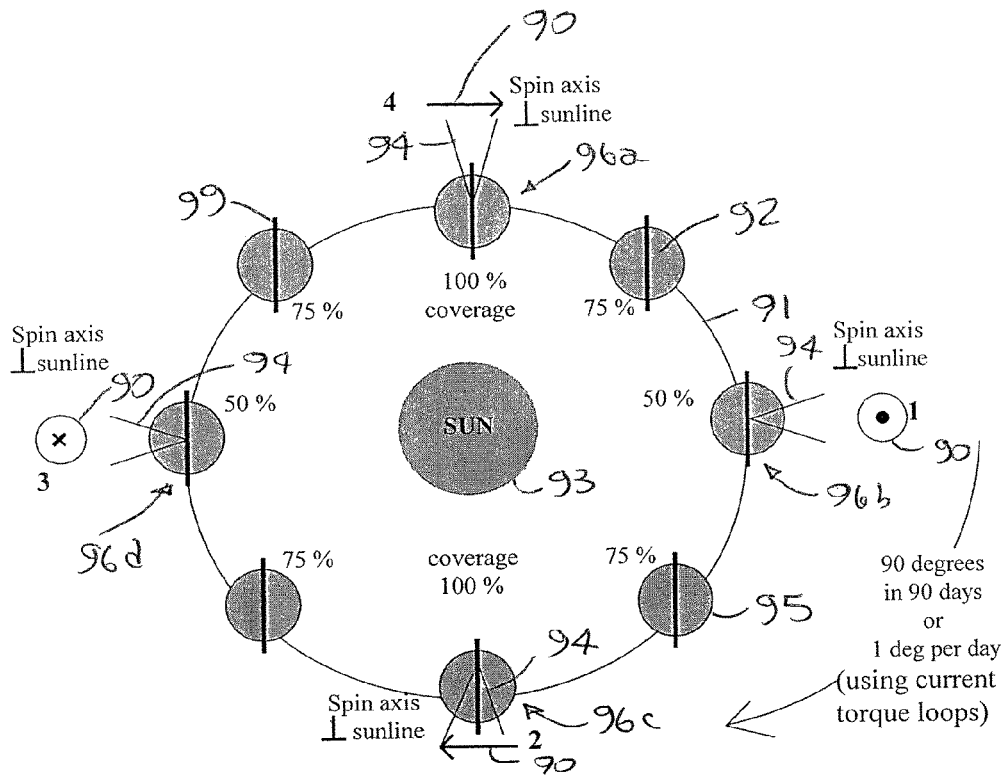
FIG. 15 is a diagram of a controlled precession of the spin axis from 0 to 1 degree per day in a polar orbit in accordance with the present invention.

Referring to FIG. 15, there is shown a plan view of a diagram of the Earth's orbit 91 about the sun 93, looking down at the Earth 92 through the North pole. Hence, the circumferences of the eight circular Earths 92 depicted correspond to the equator 95. For convenience, the Earth's orbit 91 is shown as circular rather than elliptical.

The "polar" orbit 99 of a satellite 20 about the poles of the Earth 92, which replaces an orbit in the ecliptic plane at or near the equator 95, is shown as a dark, vertical line on the earth. According to the controlled precession of the spin axis from 0 to 1 degree per day mission, the polar orbit plane 99 of the satellite 20 is fixed in inertial space rather than the spin axis of the satellite being fixed at the ecliptic pole as before. Consequently, each polar orbit 99 is parallel to any other polar orbit 99 regardless of the Earth's 92 position along the orbital path 99. This earth orbit is a "non-sun-synchronized orbit" i.e., the normal to the earth orbital plane does not rotate at 1 deg per day and, thereby, keeping in sync with the sun line. Furthermore, the spin axis of the satellites 20 are precessed (at up to 1 deg per day in pitch and yaw) in such a way as to keep the star sensor line-of-sight substantially perpendicular to the sun lines, which are defined as a line in space from the satellite 20 to the sun 93.

In a low Earth orbit in a near-equatorial orbital plane, the sun line to a satellite 20 is perpendicular or substantially perpendicular to a normal to the ecliptic plane. With a polar orbit 99 in which the spin axis is kept fixed on the North ecliptic pole, there is extensive blockage of the star tracker line-of-sight by the Earth and, furthermore, the horizon sensor line-of-sight often points toward the sun line. Neither of these conditions is desirable.

With the satellite in polar orbit with controlled precession of the spin axis from 0 to 1 degree per day, a low-rate spin-axis precession vector is applied to the satellite 20, e.g., using current torque loops, to cause the satellite's spin axis to precess (in both pitch and yaw) in inertial space from the North ecliptic pole. The hardware constraint of such an application is that the horizon sensor field-of-view is constrained to be perpendicular or substantially perpendicular to the spin axis of the star tracker. A precession rate (for both pitch and yaw) between about ¼ degree/day and about 1 degree/day provides an acceptable precession rate that allows the satellite 20 to provide more complete terrestrial coverage of the Earth 92 than otherwise would be possible with a satellite 20 orbiting in or near the ecliptic plane and to continue to be useable as a navigational sextant. Indeed, there is no extensive blocking of the star sensor line-of-sight by the Earth and, furthermore, the operating horizon sensor line-of-sight does not point toward the sun line.

For example, by precessing the spin axis of the satellite 20 initially at a first location 96a and with a spin axis vector 90 direction as shown (to the right), at a pitch (and/or yaw) rate of degree/day, in 90 days, at location 96b, the spin axis has precessed 90 degrees with respect to the original spin axis. The spin axis is still perpendicular to the sun line; however the spin axis vector 90 is directed out of the paper, i.e., towards the North ecliptic pole. In another 90 days, at location 96c, the spin axis has precessed 90 degrees with respect to the 90-day spin axis. The spin axis is still perpendicular to the sun line; however the spin axis vector 90 is directed as shown (to the left). In still another 90 days, at location 96d, the spin axis has precessed 90 degrees with respect to the 180-day spin axis. Once again, the spin axis is still perpendicular to the sun line;

however the spin axis vector 90 is directed into the paper, i.e., towards the South ecliptic pole. Finally, after 360 days or approximately one year, the spin axis has precessed 90 degrees with respect to the 270-day spin axis and is back to the 360 day position or 0 day position, i.e., the starting point for this 360-day descriptive mission.

At positions labeled 1 and 3 in FIG. 15, at which the star tracker field-of-view is pointed at, respectively, the North and South ecliptic poles, the star tracker would be looking at the Earth 92 for 45 minutes of a 90 minute orbit; hence, the star coverage success rate is 50 percent at these two locations. The current loops can be controlled to be turned off for 45 minutes when there is no star data. Once the current loops are turned off, there are no torques acting on the satellite of any significance; the inertial attitude of the satellite spin vector does not change; and there is no further precession until the current loops are activated again after 45 minutes when the stars are again visible. The navigation success rate is still 100 percent if there is no attitude drift and if the horizon sensor is still providing Earth horizon navigation fixes.

In contrast, at positions labeled 2 and 4 in FIG. 15, the star tracker field-of-view is pointed perpendicular to both ecliptic poles and the satellite's star sensor line-of-sight is never blocked by the Earth 92. At these locations, the current loops can be activated continuously and the navigation and coverage success rate is 100 percent.

As shown in FIG. 15, at each location 96a-96d in the orbit 91, the horizon field-of-view 94 of the star tracker, which is perpendicular or substantially perpendicular to the spin axis of the satellite 20 at these locations, is controlled, to record data only when the star tracker is pointed and opening away from the sun 93. At these locations 96a-96d, the spin axis remains perpendicular or substantially perpendicular to the sun line. While the horizon field-of-view 94 is pointing away from the sun 93, during the three seconds it takes for the satellite 20 (at 20 rpm) to rotate about its spin axis, horizon measurements can be taken of the Earth during this time (1½ seconds every three seconds). More particularly, at each position labeled 1, 2, 3, and 4 in FIG. 15, during the assumed rotation of 3 seconds (for 20 rpm), the horizon sensor field-of-view would be pointed towards the sun 93 for one-half of the rotation and towards the Earth 92 for the other half of the rotation (1½ seconds).

To protect the horizon sensor, either the sensor would be turned off or it would be closed during the "sunny-side" half-period. The remaining 1½ seconds is ample time for the horizon sensor to acquire data during the half-period when the horizon sensor is looking at the Earth (away from the sun). The navigation and coverage success rate is 100 percent. Even though the horizon sensor may only make a minimum of 1 Earth horizon update every 3 seconds, this is more than enough sampling rate to maintain an extremely accurate navigation solution. There are no propulsive thrusters or significant atmospheric drag to modify the spinning satellite's orbit during a few seconds.

Figures 16A, 16B, 16C:
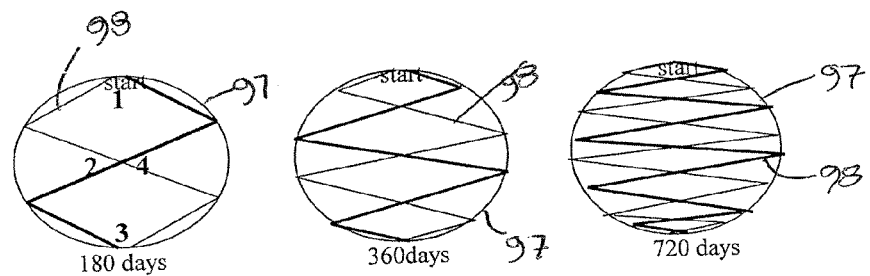
FIG. 16A shows the celestial sphere coverage for a pitch rate precession of 1 degree/day.
FIG. 16B shows the celestial sphere coverage for a pitch rate precession of ½ degree/day.
FIG. 16C shows the celestial sphere coverage for a pitch rate precession of ¼ degree/day.

Those of ordinary skill in the art can appreciate that the system may require additional data storage space for handling a potentially greater number of celestial objects that can be used by the star tracker to determine inertial attitude. With a polar orbit and a precessing artificial satellite spin-axis, potential celestial targets for determining the inertial attitude with respect to the polar orbit plane, at first glance, may seem to include the entire celestial catalog. However, as FIGS. 16A-16C show, not every celestial body (star) needs to be included. Indeed, only those celestial bodies (stars) that are situated along or within a few degrees of the (pre-determined and repeatable) spin axis tracks 98 in the corresponding celestial sphere 97 are necessary.

The comparative effect of pitch (and/or yaw) rate on celestial sphere coverage is shown in FIGS. 16A to 16C. The bold lines are on the "front" side of the celestial sphere and the light lines are on the "back" side of the celestial sphere. FIG. 16A shows the results for a 1 degree/day pitch precession rate and a 1 degree/day yaw precession rate. FIG. 16B shows the results for a ½ degree/day pitch precession rate and a 1 degree/day yaw precession rate. FIG. 16C shows the results for a ¼ degree/day pitch precession rate and a 1 degree/day yaw precession rate. The latter celestial sphere (FIG. 16C) provides greater terrestrial coverage of the Earth (and/or celestial sphere) as shown by the number and proximity of the spin axis tracks 98, but, the coverage comes at a cost of the longest mission time (2×720 days) in relation to the other two. The coverage from the spin axis tracks in FIG. 16A is not as comprehensive as the either of those shown in FIG. 16B or 16C, but it has the shortest time to completion (2×180 days).

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. A method of controlling inertial attitude of an artificial satellite, the artificial satellite having a spin axis, a star track sensor, and a navigation data device, in order to perform a navigation function and to maximize terrestrial coverage of the Earth by said artificial satellite, the method comprising:
   deploying the artificial satellite in an orbit about the Earth;
   applying gyroscopic precession to the artificial satellite spin axis to precess and maintain said satellite at a desired inertial attitude in inertial space;
   deploying the artificial satellite so that the spin axis is initially perpendicular to or substantially perpendicular to sun lines; and
   applying gyroscopic precession to the artificial satellite spin axis to precess the spin axis away from an initial deployed attitude at a selectively-variable precession rate and to maintain the spin axis perpendicular to or substantially perpendicular to said sun lines.

2. The method as recited in claim 1 further comprising:
   disposing the star track sensor at or near the spin axis of the artificial satellite;
   structuring and arranging the star track sensor to have a small field-of-view and a line-of-sight at the spin axis of the artificial satellite;
   determining a square of a first radius ($R_1^2$) of a track of a first astronomical object;
   determining a square of a second radius ($R_2^2$) of a track of a second astronomical object; and
   determining a square of a third radius ($R_3^2$) of a track of a third astronomical object using data produced by the star track sensor.

3. The method as recited in claim 2 further comprising:
   selecting the first astronomical object, the second astronomical object, and the third astronomical object from among a plurality of astronomical objects that are positioned along or within a few degrees of a spin axis celestial track of the orbiting artificial satellite.

4. The method as recited in claim 1, wherein the navigation data device is perpendicular or substantially perpendicular to and has a field-of-view oriented perpendicular to or substantially perpendicular to the field-of-view of the star track sensor.

5. The method as recited in claim 1, wherein the precession rate includes at least one of a pitch rate and a yaw rate with respect to the star track sensor field-of-view.

6. The method as recited in claim 1, wherein the precession rate is between ¼ degree/day and 1 degree/day.

7. The method as recited in claim 1, wherein applying gyroscopic precession includes:
providing at least one torque-producing device on a corresponding outer surface of the artificial satellite; and
controlling at least one of an amount of current and a direction of current flowing through at least one of the at least one torque-producing devices to correct pitch and yaw.

8. The method as recited in claim 1, wherein the navigation data device is selected from the group comprising an Earth horizon detector, a planet detector, a sun detector, an Earth landmark detector, and a proliferated spinning satellite detector.

9. The method as recited in claim 1, wherein when the star track sensor field-of-view is pointed at an ecliptic pole of the Earth, the method includes controlling the track sensor so that attitude of the spin vector remains unchanged with no precession when the star track sensor is pointed at the Earth.

10. The method as recited in claim 1, wherein when the navigation data device field-of-view is pointed towards the sun, the method includes turning off or shielding said navigation data device from taking data when the navigation data device is pointed at the sun.

11. The method as recited in claim 1, wherein the orbit is selected from the group comprising a polar orbit, a low Earth orbit, and a high Earth orbit.

12. A computer program product in the form of a non-transitory computer readable media having a computer program stored thereon, the computer program being executable on a processor and comprising executable machine language or code for:
deploying an artificial satellite in an orbit about the Earth;
applying gyroscopic precession to the artificial satellite to maintain said satellite at a desired inertial attitude in inertial space;
deploying the artificial satellite so that a spin axis of the artificial satellite is perpendicular to or substantially perpendicular to sun lines; and
applying gyroscopic precession to the artificial satellite to maintain the spin axis perpendicular to or substantially perpendicular to said sun lines in inertial space.

13. The computer program product as recited in claim 12 further comprising executable machine language to uplink and to downlink commands with a terrestrial-based control processor.

14. The computer program product as recited in claim 12, further comprising executable machine language for:
determining a square of a first radius ($R_1^2$) of a track of a first astronomical object;
determining a square of a second radius ($R_2^2$) of a track of a second astronomical object;
determining a square of a third radius ($R_3^2$) of a track of a third astronomical object using data produced by a star track sensor disposed at or near a spin axis of the artificial satellite, the star track sensor structured and arranged to have a small field-of-view and a line-of-sight at the spin axis of the artificial satellite; and
determining a set of navigation orbital elements that in combination with an on-board clock provide an on-board, continuous, real-time navigation solution for the satellite in an Earth reference frame.

15. The computer program product as recited in claim 12, further comprising executable machine language for applying gyroscopic precession that includes:
controlling at least one of an amount of current and a direction of current flowing through at least one torque-producing device on a plurality of outer surfaces of the artificial satellite to correct pitch and yaw.

16. The computer program product as recited in claim 12 further comprising maintaining an on-board, continuous, real-time earth navigation solution in an Earth coordinate reference frame using periodic Earth horizon fixes referenced to an on-board clock and using periodic star fixes.

17. The computer program product as recited in claim 12 further comprising maintaining an on-board look-up table of ground-site location and of earth navigation coordinates of other satellites.

18. The computer program product as recited in claim 17 further comprising providing communication links with any of the other satellites.

19. The computer program product as recited in claim 12 further comprising determining a set of navigation orbital elements that, in combination with an on-board clock, provide an on-board, real-time navigation solution in an Earth reference frame.

20. The computer program product as recited in claim 12 further comprising executable machine language or code for:
maintaining an on-board catalog of terrestrial locations in Earth navigation coordinates;
maintaining an on-board catalog of other artificial satellite locations in Earth navigation coordinates;
providing at least one communication link between at least one terrestrial location or satellite location; and
maintaining an on-board, continuous, real-time, Earth navigation solution in an Earth coordinate reference frame.

21. The computer program product as recited in claim 20 wherein maintaining the Earth navigation solution includes:
performing periodic star fixes; and
performing periodic Earth horizon fixes referenced to an on-board clock.

* * * * *